United States Patent [19]

Rausch

[11] Patent Number: 4,938,437

[45] Date of Patent: Jul. 3, 1990

[54] RUBBERLESS TIRE BEAD ASSEMBLIES AND METHODS OF MAKING SAME

[75] Inventor: Doyle W. Rausch, Niles, Mich.

[73] Assignee: National Standard Company, Niles, Mich.

[21] Appl. No.: 130,320

[22] Filed: Dec. 8, 1987

[51] Int. Cl.$^5$ .............................................. B60C 15/05
[52] U.S. Cl. ................................... 245/1.5; 152/527; 152/540; 156/136; 428/371
[58] Field of Search ................. 140/88, 92.2; 156/136; 57/902; 152/540, 545, 527, DIG. 8; 245/1.5; 428/35.9, 371

[56] References Cited

U.S. PATENT DOCUMENTS

| | | | |
|---|---|---|---|
| 1,493,735 | 5/1924 | Cochran . | |
| 1,503,883 | 8/1924 | Cobb | 245/1.5 |
| 2,014,359 | 9/1935 | Morrison | 245/1.5 X |
| 3,106,952 | 10/1963 | Rudder | 245/1.5 X |
| 3,372,894 | 3/1968 | Pearce | 245/1.5 |
| 3,949,800 | 4/1976 | Lejeune | 245/1.5 X |
| 4,290,471 | 9/1981 | Pfeiffer | 245/1.5 X |
| 4,406,317 | 9/1983 | Merten | 245/1.5 X |

FOREIGN PATENT DOCUMENTS

| | | |
|---|---|---|
| 0013735 | 8/1980 | European Pat. Off. . |
| 3440440 | 5/1985 | Fed. Rep. of Germany . |
| 3524287 | 1/1987 | Fed. Rep. of Germany . |
| 3613100 | 10/1987 | Fed. Rep. of Germany . |
| 3613349 | 10/1987 | Fed. Rep. of Germany . |
| 3613350 | 10/1987 | Fed. Rep. of Germany . |
| 2389504 | 12/1978 | France . |
| 2123360 | 2/1984 | United Kingdom . |

*Primary Examiner*—Mark Rosenbaum
*Attorney, Agent, or Firm*—Emrich & Dithmar

[57] ABSTRACT

Rubberless tire bead assemblies are disclosed, containing either a single wire element or multiple wire elements wound about an axis to provide a plurality of convolutions of the single wire or multiple wire elements to provide the bead hoop and shape-retaining members engaging the bead hoop about the circumference of the bead hoop to retain the bead assembly in a planar configuration. Rubber tire bead assemblies having wire termination ends positioned internally or externally with respect to the bead assembly and methods of making these bead assemblies are disclosed.

158 Claims, 12 Drawing Sheets

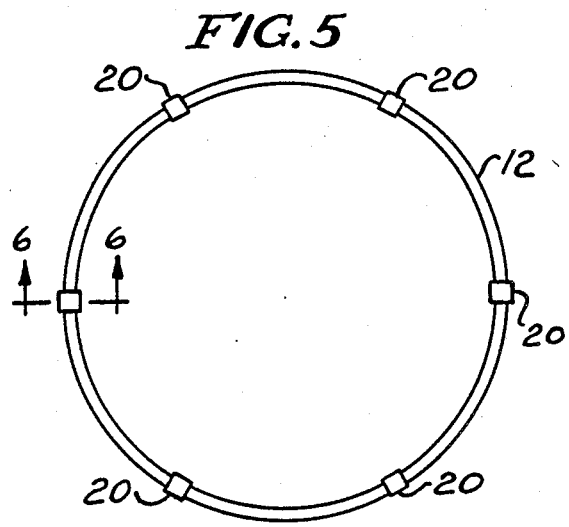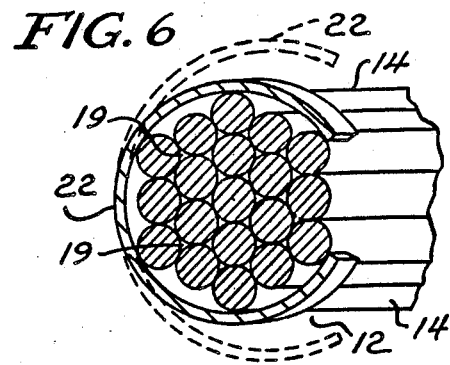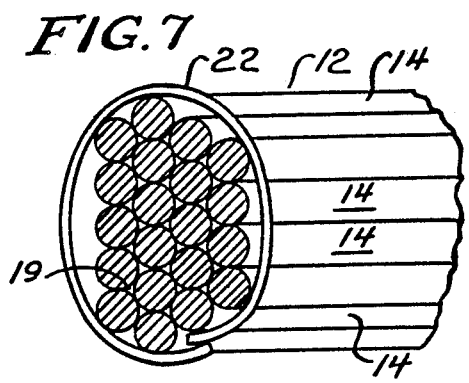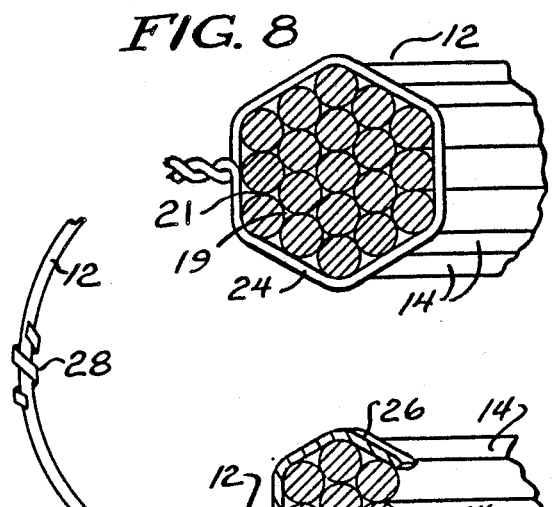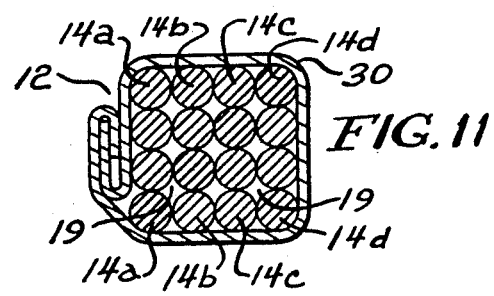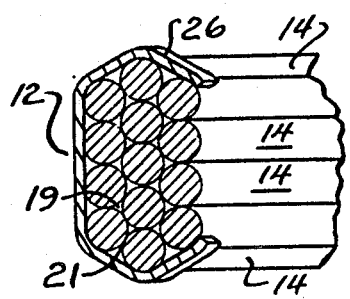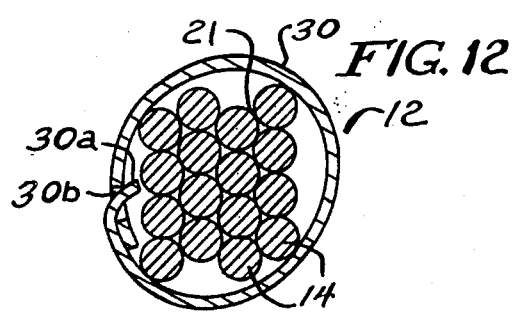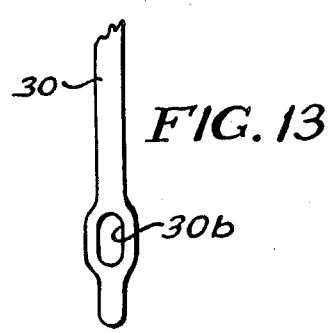

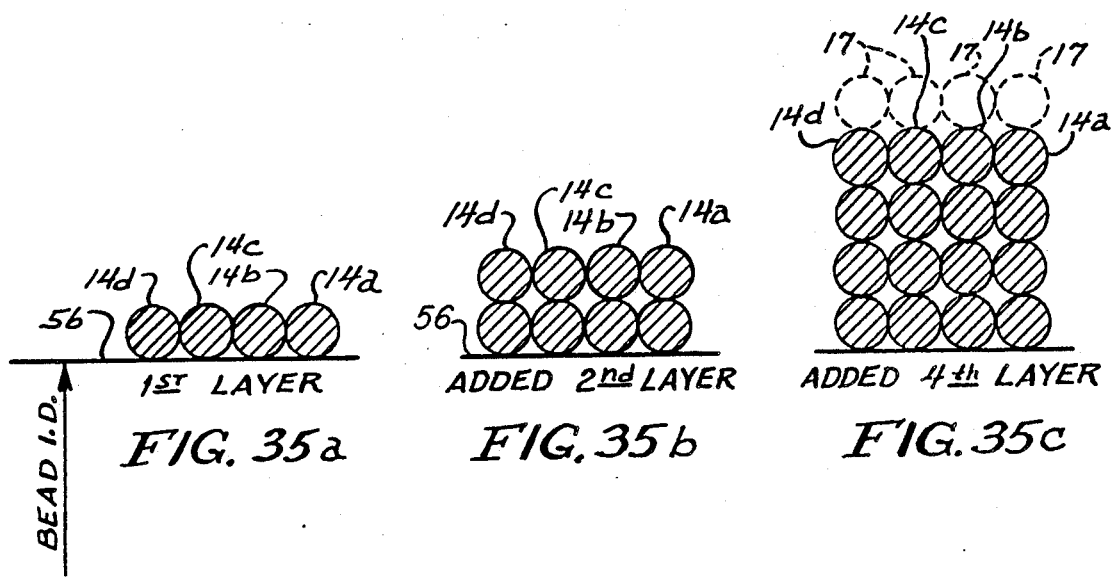
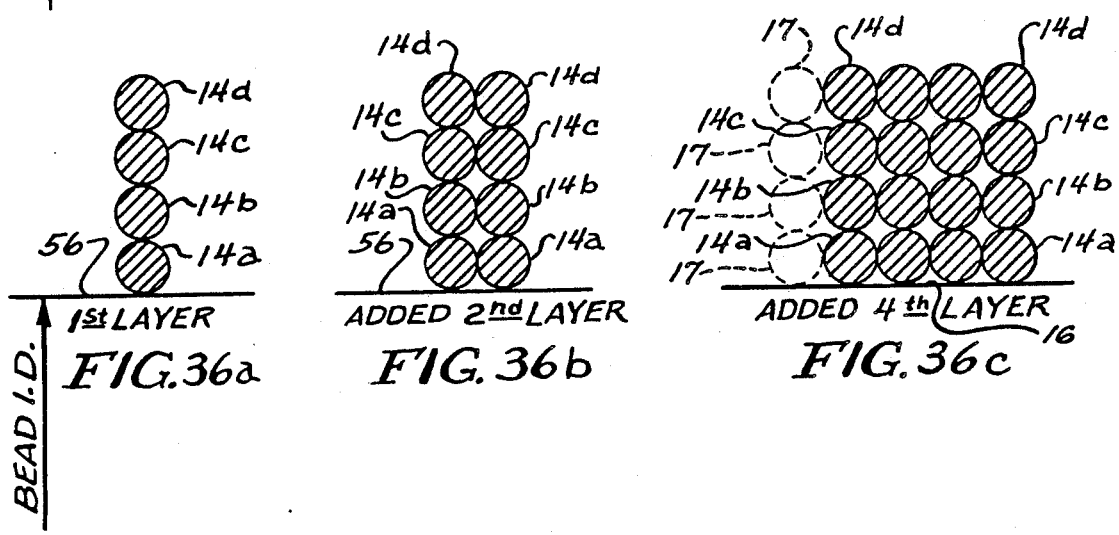
FIG. 37

RUBBERLESS TIRE BEAD ASSEMBLIES AND METHODS OF MAKING SAME

BACKGROUND OF THE INVENTION

The present invention relates to rubberless tire bead assemblies and to novel methods of manufacturing such tire bead assemblies to produce a strength efficiency tire bead assemblies which are of the same efficiency as conventional wire tire bead assemblies which include a rubber or polymeric coating thereon.

All automotive tire bead assemblies composed of round wire strengthening elements in general use contain either a thin coating of rubber on the wire surface or contain wire elements embedded in a ribbon or elongate form of rubber, with the single exception being the rubberless cable bead. An important function of the rubber coating around the wire element is to hold the multiple wire wraps together after forming so that the tire bead assembly may be removed from the bead forming machine and handled during the course of the bead assemblies incorporation into the tire during the tire building operation. The necessity for the existence of such an adhesive function of the wire elements becomes increasingly important for stiff, high-strength wires, such as steel, because of their spring-back characteristics. That is, although a wire may be readily and neatly wound on a spool, the wire often becomes entangled upon removal from such a spool because of back tension, wire twist and cast properties of the wire elements. Also, such bead assemblies tend to lose their constructional integrity upon removal from the bead forming drum unless the wire is rubber coated. The cable bead, generally composed of a wrap wire helically wound around a core hoop contains an inherent compressive or resisting force and because of the helical wrap geometry, cable beads require excessive forming times and operations, thereby resulting in a substantially expensive bead assembly.

One deficiency of conventional rubber coated wire tire bead assemblies arises when under the low viscosity or near liquid environment that occurs during final curing of the completed tire, the adhesive nature of the rubber coated wires is substantially reduced and spring-back of the wire elements or other distortion to the original bead geometry may occur.

Furthermore, a limitation to bead geometry is inherent to conventional tire bead assemblies comprised of multiple wraps of rubber ribbon containing more than one wire. Such ribbons must be wound with the ribbon width oriented exactly parallel to the winding axis so as to consume in each wrap of ribbon precisely the same length on each side of the ribbon. This forming requirement prohibits constructions, such as those containing conical geometric form such as would mate with a tire wheel rim having state-of-the-art tapered surfaces of revolution.

A further potential deficiency of state-of-the-art beads in general use is the inherent absence of void space free of rubber internal to the bead wire array.

Additionally, although in conventional round wire tire bead assemblies the rubber bonding or coating thereon facilitates bonding the wires together to provide the resultant tire bead assembly or bundle, the use of a rubber coating on the bead wires to manufacture tire bead assemblies requires a separate rubber making operation and expensive extrusion equipment to effectively produce the thin coating on the wire elements that comprise the tire bead assembly. The resultant reduced speed limitations in manufacturing such tire bead assemblies and the necessity of required overlaps of the wire endings for proper adherence of wire end to bead assembly and the tendency of the wire endings to spring away from the bundle during the tire making processes are problems that are inherent in such rubber-coated tire bead assemblies. Additionally, the high cost of the special formulated rubber coatings results in higher cost tire bead assemblies which, if eliminated, would substantially reduce the time required for manufacturing such tire bead assemblies and would decrease the cost of such manufacture process thereby providing higher speed and greater productivity during the bead making operations.

Prior art attempts to make a rubberless tire bead assemblies include, for example, Lejeune U.S. Pat. No. 3,949,800, Grosch, U.S. Pat. No. 4,216,814, Pfeiffer U.S. Pat. No. 4,290,471, and Mertin, U.S. Pat. No. 4,406,317 patents which disclose a plurality of rectangular-shaped wire elements to make a bead assembly having sharp corners. The resultant rubberless tire bead assemblies exhibit an absence of voids within the bead assemblies and require a special ductile steel material to be positioned around the bead as an integral part of the bead making cycle. Such tire bead assemblies possess sharp corners that adversely effect other materials in the bead are during service, do not contain void reservoirs within the bead assemblies, utilize expensive polygon-shaped wire elements, and require that the bead making cycle is dominated by the time necessary to deform and position steel materials around the bead at numerous locations to retain the bead assembly. Accordingly, such beads have enjoyed little, if any, commercial acceptance.

Additionally a rubberless round wire bead with homogeneous joining of touching or contiguous wires, incorporating joining means such as sintering has been disclosed by Pearce U.S. Pat. No. 3,372,894.

Additionally, the conventional cable bead assembly is a rubberless tire bead assembly which is generally comprised of at least two wire components, a wire wound about a core wire, and a ferrule component for joining the wound wire ends. However, such cable bead assemblies tend to be excessively flexible and prone to bending and require excessive time cycles in manufacturing the bead assembly thereby resulting in increased costs of manufacture. See, for example, Gore U.S. Pat. No. 2,069,525 to such a cable bead assembly.

U.S. Pat. No. 4,039,015 discloses a rubberless bead which may be formed, for example, as the result of interlocking a multiple number of independent hoops with welding or interlocking a multiple number of hoops twisted from a single wire length with welding. However, such constructions are readily distorted due to the helical or nonparallel nature of individual wire axes one to another. Furthermore, the disclosed construction made from a single length of wire contains a relatively large number of wire crossover points which represent points of nonuniform stress distribution under load and potential wear and deformation cites.

SUMMARY OF THE INVENTION

It is one object of the present invention to provide novel and unique rubberless tire bead assemblies possessing strength efficiencies corresponding to rubber-coated prior art tire bead assemblies.

It is another object of the present invention to provide novel means for manufacturing rubberless tire bead assemblies which eliminate the rubber costs in manufacturing bead assemblies and results in higher speed and greater productivity during the tire bead making operations.

It is a further object of the present invention to utilize a variety of shape retaining means or bonding methods for holding a rubberless tire bead assembly together after manufacture of the bead assembly or bundle to provide a rubberless tire bead assembly possessing interstitial voids between the wires wherein each of the convolutions of the wire elements are substantially in a planar contact relationship with adjacent convolutions of the wire elements and all wire axes are substantially parallel one-to-another.

A further object of the present invention is to provide a novel method for manufacturing unique rubberless single wire tire bead assemblies wherein at least one end of the predetermined length of the single wire is positioned internal to the array of wires comprising the body of the tire bead assembly.

It is another object of the present invention to provide a novel method for manufacturing a rubberless single wire tire bead assembly wherein at least one end of the predetermined length of the single wire is positioned externally on the side wall surface of the tire bead assembly.

It is still another object of the present invention to provide a novel method for manufacturing unique rubberless tire bead assembly comprised of a plurality of predetermined lengths of substantially round wires in a layered sequence wherein at least one end of the predetermined lengths of wires is positioned on either the inside diameter surface of the tire bead assembly or is positioned on the side wall surface of the tire bead assembly.

It is yet another object of the present invention to provide a novel method for manufacturing rubberless tire bead assemblies comprised of a plurality of predetermined lengths of substantially round wires wherein the inside diameter surface of the bead assembly is tapered.

The strength efficiency of single wire tire bead assemblies comprised of densely packed symmetrical bead construction, such as, for example, 2-3-2, 4-5-6-5, 4×4, and 3-4-5-4, having the elongated wire elements, of nominally circular cross section and free of rubber or other polymeric material, has resulted in single wire tire bead assemblies which possess a strength sufficiency equivalent to conventional round wire beads having a rubber bonding or coating on the wires. The strength efficiency of rubberless tire bead assemblies comprised of a plurality of predetermined lengths of substantially round wires of symmetrical bead constructions, such as, 3×3, 4×4, and 5×5 and others, are equivalent to conventional ribbon-type bead assemblies. The practical advantage of eliminating rubber from the tire bead assembly or bundle includes the elimination of the bead rubber coating costs and improved manufacturing operation, such as, higher processing cycle speeds and increased productivity in the bead making operation. The resultant rubberless bead assemblies include a void volume or region within the tire bead assembly or bundle within the wire array, which provides a reservoir or collection region for the air entrapped during the positioning of the tire bead assembly or bundle within the tire carcass during the tire building operation. Additionally, the method of manufacture permits the opportunity to weld or otherwise bond either the wires and wire ends at critical points in or on the bead bundle so as to prevent distortion of the wire and movement away from the bead or bundle during the tire manufacturing operation.

The variety of shape-retaining means for bonding or for engaging at least a portion of the plurality of the convolutions of the single wire or filament superimposed upon each other periodically about the bead circumference to hold the bead assembly or bundle together, include the use of metal clip members applied preferably simultaneously at several locations about the bead circumference, as well as other bonding devices and methods such as, using metal ties, spring clips, spiral wrapped fabrics or wires around the entire or a portion of the bead circumference, spot soldering, brazing or welding periodic locations about the bead circumference, use of solder-coated wire in the bead wires, gluing or use of adhesives, applying fusible polymeric material periodically or entirely around the bead circumference, dipping the bead assemblies into an adhesive coating, and miniature hose clamp members which securely engage at least a portion of the convolutions of the single wire to hold the bead assembly. It should be understood that even though most of the above described methods are applicable to the bead assembly after the component wire wraps have been formed, the methodology envisioned includes application of bonding means or material to the wire feeding into the forming apparatus, i.e., periodic or continuous application of bonding means or material to the wire before or during formation of the bead assembly. Each method or technique retains and holds the wires within the bead assembly in surface contact with one another substantially in a plane parallel to the remaining convolutions of the wire within the tire bead assembly and provides that void volumes exist between the convolutions of the wire within the tire bead array.

In conventional bead making processes, the wire strand or strengthening element is coated with a specially formulated rubber coating which, when the single wire or ribbon of wires is wound upon itself form the tire bead assembly, holds and retains the resultant bead assembly together for in subsequent handling and usage. Subsequent positioning of such rubber coated tire bead assemblies within the tire during the tire building operation, the rubber coating is vulcanized to provide a cured tire bead assembly within the tire which does not include voids extending along the circumferential length of the bead assembly. During such known tire building operations, the folding of the tire carcass sidewall materials about the bead ring assembly entrap air and result in the occurrence of air bubbles. By utilizing the unique rubberless tire bead assembly in accordance with the present invention, the void volumes that extend substantially throughout the circumferential length of the tire bead hoop, permits the air bubbles to be dissipated and minimized, thereby providing an improved finished tire. Moreover, the tire bead assembly geometry and structure resists changes when the bead assembly is positioned within the tire and undergoes vulcanization. That is to say, the geometry of a conventional prior art tire bead assembly may become distorted out of a planar configuration during vulcanization of the tire thereby resulting in a geometrical distorted tire bead or loss of precise bead position when it is cured within the tire carcass. Such problems of the prior art rubber coated wire bead assemblies are alleviated by the present invention.

Additionally, in accordance with the present invention, any residual forces tending to distort the geometry of the formed bead are substantially minimized and eliminated. In contrast, the formation of the bead assembly resulting from the interlocking of a multiple number of hoops from a single wire length in accordance with prior art patent 4,039,015, may result in highly localized residual forces due to the inherent friction of the numerous crossover points in the substantially nonparallel relation of the wires.

When the completed rubberless tire bead assemblies in accordance with the present invention have been constructed, it may be desirable to use preformed clips which may relatively quickly engage at least a portion of the convolutions of the wire while the tire bead assembly is on the forming drum. Furthermore, if such clips are used as a precursor means primarily to facilitate removal of the formed bead from the forming drum, subsequent operations may well be utilized to complete tire bead assembly, such as, spot welding, soldering, gluing, spot dipping the bead assembly into an adhesive or the use of a fabric or wire wrap around the circumference of the bead assembly, to provide that the elongated wire elements of a nominally circular cross section are positioned parallel relative to one another from convolution to convolution with the elongated element surfaces in direct contact with one another such that the void volumes may exist between the convolutions of the elongated wire elements of the tire bead assembly.

It is envisioned that the principle of precursor, or partial, bonding on the forming drum may take a variety of forms including those mentioned above for completing the tire bead assembly.

In still a further embodiment of the present invention, a method of manufacturing densely packed rubberless single wire tire bead assemblies wherein the wire ends are positioned internal to the body of the tire bead assembly or in an internal position of the wire array or wherein at least one of the termination ends is positioned external to the tire bead assembly, either on the inside diameter surface or on the sidewall surface. When at least one tire bead end of the elongated wire or strength element is positioned on the inside diameter surface of the tire bead assembly, termination ends of the elongated wire material may be treated in accordance with my now co-pending application Ser. No. 085,642, filed Aug. 13, 1987, now U.S. Pat. No. 4,820,563, issued Apr. 11, 1989, and the disclosure and the treatment of bead ends therein is incorporated herein by reference to improve the strength efficiency of the resultant rubberless tire bead assemblies.

The present invention consists of certain novel features and structural details hereinafter fully described, illustrated in the accompany drawings, and particularly pointed out in the appended claims, it being understood that various changes in the details may be made without departing from the spirit and scope thereof or sacrificing any advantages of the present invention.

BRIEF DESCRIPTION OF THE DRAWINGS

FIG. 5 is a side elevational view of a rubberless tire bead assembly in accordance with the present invention showing shape, retaining means for engaging at least a portion of the convolutions of the wires within the bead assembly spaced equally about the bead circumference to retain the tire bead assembly in a planar configuration;

FIG. 6 is an enlarged cross-sectional view taken along lines 6—6 of FIG. 5 showing a dense packed 3-4-5-4-3 rubberless tire bead construction having one embodiment of the shape-retaining means engaging at least a portion of the plurality of the convolutions of the single wires to retain the tire bead assembly in a planar configuration in accordance with the present invention;

FIG. 7 is an enlarged cross-sectional view of dense packed 4-5-6-5 rubberless single wire tire bead assembly showing a further embodiment of the shape-retaining means engaging the tire bead array in accordance with the present invention positioned about the tire bead assembly to retain the surfaces of the wires in contact with each other such that void volumes exist between the convolutions of the wire elements within the bead assembly;

FIG. 8 is an enlarged cross-sectional view of dense packed 3-4-5-4-3 rubberless tire bead assembly showing another embodiment of the shape-retaining means engaging the tire bead array in accordance with the present invention positioned about the tire bead assembly to retain the elongated wire element surfaces in contact with each other such that void volumes exist between the convolutions of the wire elements within the bead assembly;

FIG. 9 is an enlarged cross sectional view of a dense packed 4-5-4 tire bead assembly showing another embodiment of the shape-retaining means engaging the tire bead array in accordance with the present invention positioned and engaging at least a portion of the plurality of convolutions of the single wire in direct contact with each other such that void volumes exist between the wire elements within the bead assembly;

FIG. 10 is a fragmentary elevational view of a rubberless tire bead assembly showing another embodiment of the shape retaining means engaging the tire bead array in accordance with the present invention periodically and circumferentially engaging the tire bead assembly to retain the elongated wire element surfaces in direct contact with each other such that void volumes exist between the wire elements;

FIG. 11 is an enlarged cross-sectional view of a 4×4 rubberless tire bead assembly showing another embodiment of the shape-retaining means in accordance with the present invention periodically wrapped around the tire bead assembly to retain the elongated wire element surfaces in contact with each other such that void volumes exist between the wire elements within the bead assembly;

FIG. 12 is an enlarged cross-sectional view of a dense packed 4×4 rubberless tire bead assembly showing another embodiment of the shape-retaining means for engaging in accordance with the present invention engaging the tire bead assembly to retain the elongated wire elements surfaces in contact with each other such that void volumes exist between the wire elements;

FIG. 13 is an enlarged plan view of one end of the shape-retaining members as shown in FIG. 12;

FIGS. 35a–35c are schematic sequential drawings illustrating one method of forming a 4×4 rubberless tire bead assembly containing four wire elements wrapped radially therearound with the termination ends being positioned in the inside and outside diameter surfaces of the tire bead assembly in accordance with the present invention;

FIGS. 36a-36c are schematic sequential drawings illustrating another method of forming a 4×4 multiple wire tire bead assembly wherein the termination ends are positioned on of the bead assembly in accordance with the invention; and FIG. 37 an axial plan view of the 4×4 multiple wire tire bead assembly of FIGS. 36a-36c showing the termination ends on the sidewall of the bead assembly.

DESCRIPTION OF THE PREFERRED EMBODIMENTS

Figure 1:
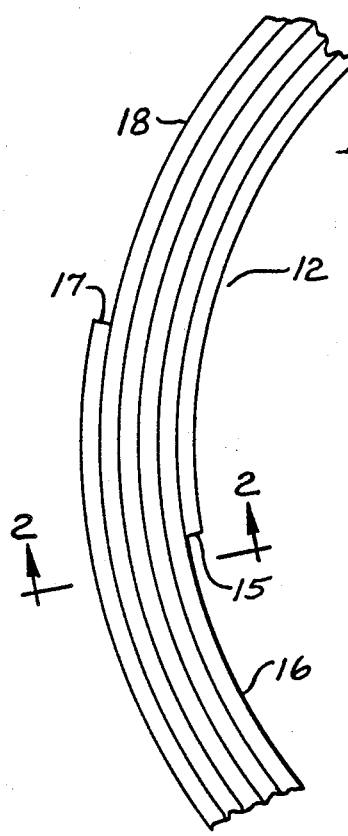
FIG. 1 is a fragmentary axial plan view of a 5×5 rubberless multiple wire tire bead assembly in accordance with the present invention.

For the purpose of facilitating an understanding of the scope of the present invention, illustrated in the drawings of several embodiments of the present invention, like numerals have been used throughout the several views to designate the same or similar parts. The present invention is directed to rubberless tire bead assemblies and to novel mechanical and physical treatments of the assembled tire bead assembly to hold and retain the tire bead assembly within a planar configuration. Additionally, the present invention is directed to novel methods of manufacturing rubberless tire bead assemblies containing either a single elongated wire or strengthening element or containing multiple or a plurality of elongated wire or strengthening elements. And, as used in the present disclosure, the reinforcing or strengthening element utilized in manufacturing the ribbontype tire bead assembly as well as the single reinforcing element tire bead assembly is a wire element.

Figure 2:
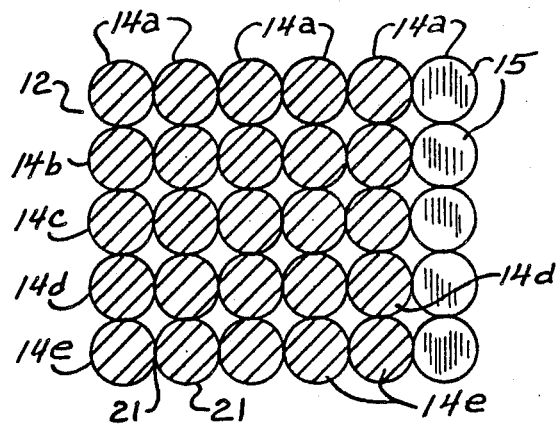
FIG. 2 is a cross-sectional view of the 5×5 rubberless multiple wire tire bead assembly taken along lines 2—2 of FIG. 1.

FIG. 1 illustrates and discloses a 5×5 tire bead assembly 12 that is manufactured by utilizing five strands of a wire or strengthening element 14, radially wrapped upon themselves five times to provide the 5×5 rubberless tire bead assembly 12. Each of the wires 14a-14e have an inner termination end 15, as shown in FIGS. 1 and 2, on the inner diameter surface 16 of the bead assembly 12, and an outer termination end 17, as shown in FIG. 1, on the outer diameter or peripheral surface 18 of the bead assembly 12. The tire bead assembly 12 of this particular 5×5 construction, is comprised of multiple convolutions of five elongated wire elements 14a-14e, each being nominally circular in cross-section and each being free or substantially free of any elastomer or rubber envelope about the wire elements 14a-14e. The elongated wire elements 14a-14e axis of each wire 14a-14e are positioned substantially parallel relative to one another and parallel from convolution to convolution with the wire surfaces 21 in contact with at least adjacent convolutions of the wires such that void volumes exist between the wire elements 14, as shown in FIG. 2.

Figure 3:
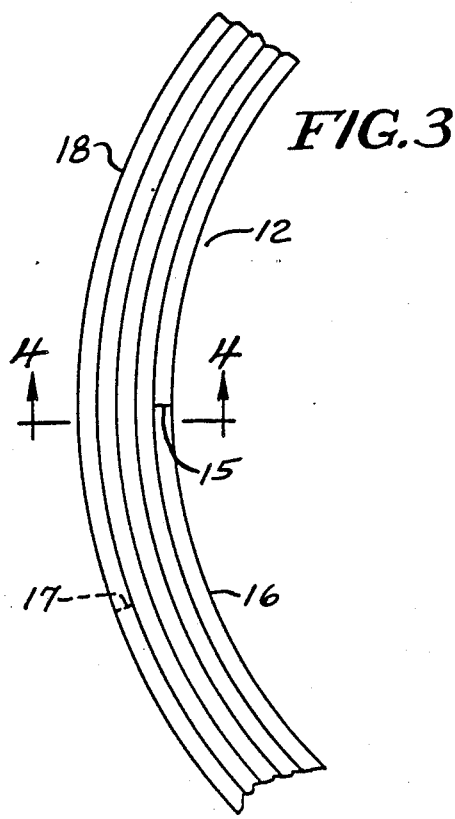
FIG. 3 is a fragmentary axial plan view of a 5×5 rubberless single wire tire bead construction in accordance with the present invention.
Figure 4:
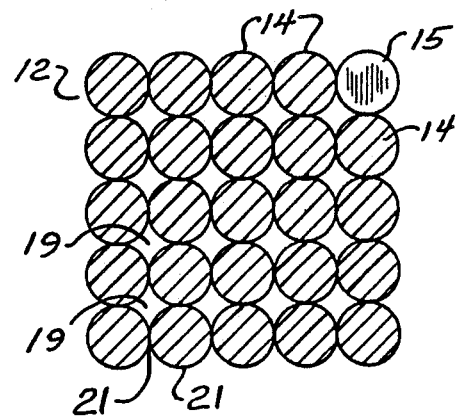
FIG. 4 is a cross-sectional view of a 5×5 rubberless single wire tire bead assembly taken along lines 4—4 of FIG. 3.

FIGS. 3 and 4 illustrated a 5×5 single wire tire bead assembly 12 comprised of a single wire element 14 wound upon itself twenty-five times. As shown in FIG. 3, the inner termination end 15 of the single wire element 14 is on the inner diameter surface 16 of the tire bead assembly 12. As is shown in FIG. 4, the elongated wire element 14 is preferably circular in cross-section and is free or substantially free of an envelope of elastomer, polymeric or rubber material, with each of the element axis being parallel relative to one another from convolution to convolution and with the elongated wire element surfaces 21 in direct contact with each other such that void volumes 19 exist between the elements, as shown in FIG. 4. The phrase free or substantially free of an envelope of elastomeric or rubber-like materials means that the wire elements used in accordance with the invention is substantially free of any elastomeric or rubber-like materials prior to incorporation into the novel tire bead assemblies. That is, the wire elements are substantially free of elastomeric or rubber-like materials that prevent the wire elements from coming into contact with each other from convolution to convolution or within a convolution. The present invention does not exclude the use of material coatings that facilitate lubrication, wear resistance, corrosion resistance or adhesion to other components of the bead area in the finished tire.

FIG. 5 illustrates a completed 3-4-5-4-3 dense packed rubberless single wire tire bead assembly 12 that has been wound on a tire bead former (not shown). The present invention contemplates the utilization of shape-retaining means 20 for engaging at least a portion of the plurality of the convolutions of the single wires 14 which comprise the tire bead assembly 12 of the bead array periodically about the bead circumference to retain the tire bead assembly 12 in a planar configuration. As shown in FIG. 5, the shape-retaining means 20 for engaging the completed tire bead assembly 12 engage the bead bodies at approximately six locations circumferentially and equally spaced about the circumference of the tire bead assembly 12.

A variety of shape-retaining means 20 for engaging, bonding or otherwise holding and retaining the rubberless bead assembly or bundle together after manufacture of the tire bead assembly or bundle is contemplated by the present invention. The shape-retaining means 20 for engaging, bonding, or retaining the wire elements within the tire bead array provides a rubberless tire bead assembly 12 possessing interstitial voids 19 between the wire elements 14 when the surfaces of the convolutions of the wire elements are substantially in planar contact relationship between adjacent convolutions of the wire elements. The variety of shape-retaining means 20 for engaging or bonding at least a portion of a plurality of the convolutions of the single wire 14 or multiple wires within the tire bead assembly 12, include the use of a preformed metal clip member 22 about at least a portion of the plurality of the convolutions of the wire element 14 of the 3-4-5-4-3 dense packed tire bead assembly 12, as shown in FIG. 6. FIG. 7 illustrates another embodiment of the shape-retaining means 20 which comprises a metal clip member 22 wrapped around the 4-5-6-5 dense packed single wire tire bead assembly 12. FIG. 8 illustrates another embodiment of the shape retaining means 20 which comprises a twisted filament or wire tie retaining member 24 which is wrapped around a dense packed 3-4-5-4-3 rubberless tire bead assembly 12. FIG. 9 illustrates another embodiment of the shape-retaining means 20 which comprises a profiled retaining clip member 26 which is positioned periodically about the circumference of a dense packed 4-5-4 tire bead assembly 12 for engaging at least a portion of the plurality of convolutions of the single wire 14 of the tire bead assembly to retain the tire bead assembly 12 in a plane perpendicular to the bead axis of revolution, with the elongated wire element surfaces in contact with each other such that void volumes 19 exist between the elements. The use of preformed retaining clip members 22 and 26 (FIGS. 6 and 9) substantially reduces the significant delay between successive bead forming cycles on the bead making machines (not shown). However, the scope of the present invention is not limited to the use of preformed clip members but is directed generally towards the use of shape-retaining means for engaging the convolutions of the wire elements, which comprise the formed bead assembly, to hold the convolutions substantially parallel relative to one another and parallel from convolution to convolution with the elongated wire FIG. 10 illustrates another embodiment of the shape-retaining means 20 for engaging the tire bead assembly to retain the elongated wire elements 14 in direct contact with each other so that void volumes exist between the wire elements. Specifically, FIG. 10 discloses a helical retaining clip or spring wrap member 28 which circumferentially engages the completed tire bead assembly to retain the bead assembly in a plane perpendicular to the bead axis of revolution. FIG. 11 discloses another embodiment of the shape-retaining means 20 which includes a mechanically interlocked retaining member 30 which is periodically wrapped around the tire bead assembly 12 to hold the elongated wire surfaces in contact with each other such that void volumes 19 exist between the wire elements. As shown in FIG. 11, the tire bead assembly 12 is comprised of four elongated wires 14a, 14b, 14c, and 14d that are sequentially wrapped around a forming mandrel (not shown) to form a 4×4 rubberless tire bead assembly. In FIG. 12, the shape-retaining means 20 includes a mechanical locking member 30 which is wrapped about the completed 4×4 tire bead assembly to force the 4×4 tire bead assembly into a close or dense packed configuration. FIG. 13 is an enlarged view of one end 30a of the mechanically locking member 30 showing the engagement of end 30a within an opening 30b of the member 30 which is positioned about the bead assembly 12 to form the dense packed 4×4 tire bead assembly.

Figure 14:
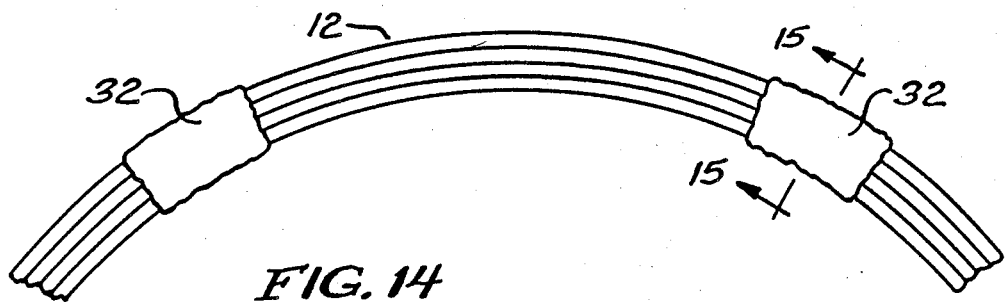
FIG. 14 is a fragmentary axial plan view of a 4×4 rubberless tire bead assembly showing the shape-retaining means in accordance with the present invention periodically engaging the tire bead assembly to retain the elongated element surfaces in direct contact with each other such that void volumes exist between the wire elements within the tire bead array.
Figure 15:
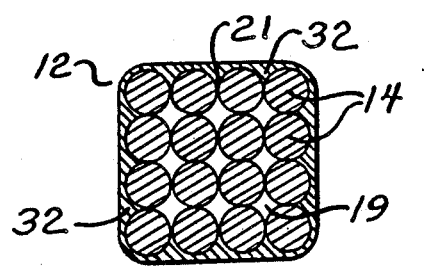
FIG. 15 is a cross-sectional view of the 4×4 rubberless tire bead assembly taken along lines 15—15 of FIG. 14.

FIGS. 14 and 15 illustrate a 4×4 rubberless tire bead assembly 12 wherein the shape-retaining means includes chemically bonding 32 the bead assembly periodically about the circumference of the bead assembly or hoop to retain the elongated wire elements in contact with each other such that void volumes exist between the elements. As shown in FIGS. 14 and 15, the chemical bonding 32 may be the use of a solder, adhesive, braze weld, or polymeric encasement of the bead assembly 12 to retain the wire elements 14 in contact with each other such that void volumes 19 exist between the elements. The chemical bonding 32 may include the use of a contact adhesive applied either during formation of the bead assembly or dipping operation wherein an adhesive or glue is applied about the outer surface of the tire bead assembly 12 after formation of the bead assembly. The utilization of a chemical bond 32 must be sufficient to retain the formed and completed tire bead assembly 12 in a plane perpendicular to the bead axis of revolution for subsequent insertion and use in the tire making process.

It is within the scope of the present invention that in certain cases it may be desirable for economic or other reasons to employ secondary operations to the formed rubberless bead such as dipping in polymeric material or otherwise molding with a polymeric material such that the entire bead wire array is filled with materials. In such instances, the void regions or volumes will not exist within the bead assembly.

Figure 16:
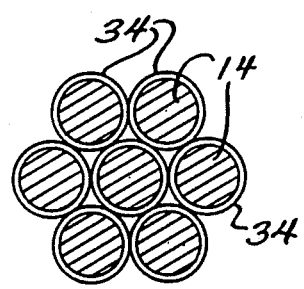
FIG. 16 is a cross-sectional view of a 2-3-2 rubberless single wire tire bead assembly wherein the elongated single wire has an adhesive or solder coating applied to the wire surface either before or during the bead assembly process in accordance with the present invention.
Figure 17:
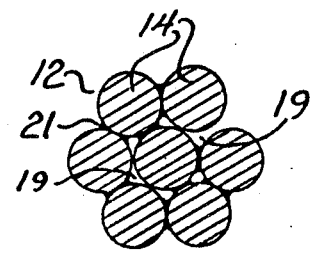
FIG. 17 is a cross-sectional view of the 2-3-2 rubberless tire bead assembly of FIG. 16 showing the subsequent bonding treatment in accordance with the present invention of the adhesive or solder coating to retain the elongated wire element surfaces in contact with other wire surfaces such volumes exist between the wire elements with the tire bead assembly.

FIGS. 16 and 17 illustrate the manufacture of a 2-3-2 rubberless tire bead assembly 12 wherein the wire element 14 is coated 34 with a solder or adhesive material either prior to or during forming operation for the tire bead assembly 12. After formation of the tire bead assembly, subsequent heating the solder coating or further chemical curing of the adhesive coating 34 results in a rubberless tire bead assembly 12 having the bead array configuration, as substantially shown in FIG. 17. The completed tire bead assembly 12 includes the cured chemical adhesive or solder coating 34 retaining the elongated wire element 14 surfaces 21 in substantial contact with at least an adjacent wire convolution such that void volumes 19 exist between the wire elements 14 to retain the tire bead assembly in a plane perpendicular to the bead axis of revolution for subsequent use in the tire making process.

Figure 18:
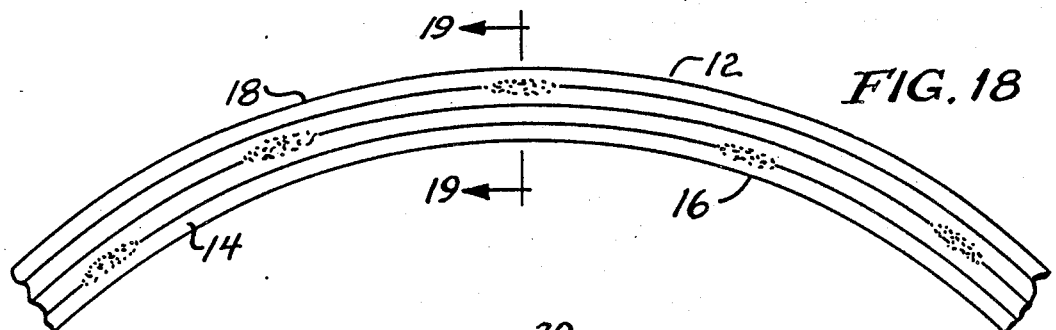
FIG. 18 is a fragmentary axial plan view of a 4×4 rubberless single wire tire bead assembly in accordance with the present invention wherein periodic adjacent wraps or convolutions of the wire element are welded or bonded together during the manufacture of the assembly to retain the elongated wire elements in contact with each other such that void volumes exist between the wire elements.
Figure 19:
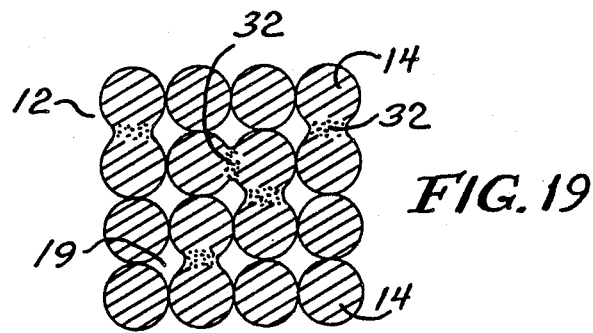
FIG. 19 is a cross-sectional view of the 4×4 rubberless single wire tire bead assembly taken along lines 19—19 of FIG. 18.

FIGS. 18 and 19 illustrate either a single wire 4×4 rubberless tire bead assembly or a multiple or four-wire 4×4 rubberless tire bead assembly which includes a further embodiment of the shape-retaining means. During the formation or manufacture buildup of the tire bead assembly 12 on the forming drum (not shown), periodic contact welds or contact soldering 32 chemically bonds adjacent convolution of the wire element or elements together. FIG. 19, shows a cross-section view of the bead array and illustrates the periodic spot welding or soldering, which may be both vertical and horizontal between convolutions of the wire element by elements to connect adjacent wire elements 14 to chemically bond and retain the elongated wire elements in contact with each other so that void volumes 19 exist between the wire elements. This chemical bonding treatment during the manufacture of rubberless tire bead assemblies provides a rubberless tire bead assembly 12 which is retained in a plane perpendicular to the bead axis of revolution for subsequent use in the tire building process.

Figure 20:
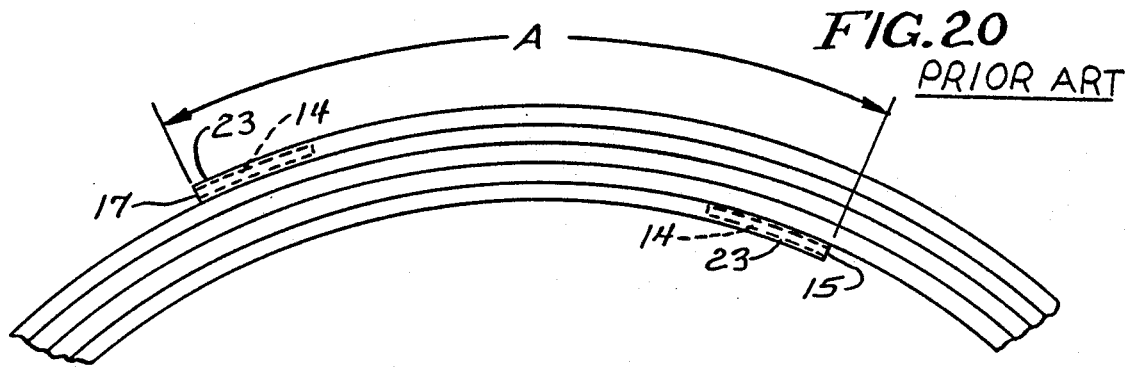
FIG. 20 is a fragmentary axial plan view of a 4×4 conventional prior art rubber coated single wire tire bead assembly illustrating the overlap condition of the inner and outer termination ends to provide a conventional tire bead assembly.

FIG. 20 illustrates a conventional prior art 3×3 tire bead assembly, wherein the individual wire elements 14 which include an envelope or rubber coating 23. In such bead assemblies, the overlapped length between the inner termination end 15 with respect to the outer termination end 17 is length A. The length A is necessary to increase the adhesion surface area so as to provide equivalent pull out adhesive force in the overlapped region. Such extended overlapped lengths of the termination ends of the wire elements 14 may provide an out-of-balance condition for such prior art tire bead assemblies.

Figure 21:
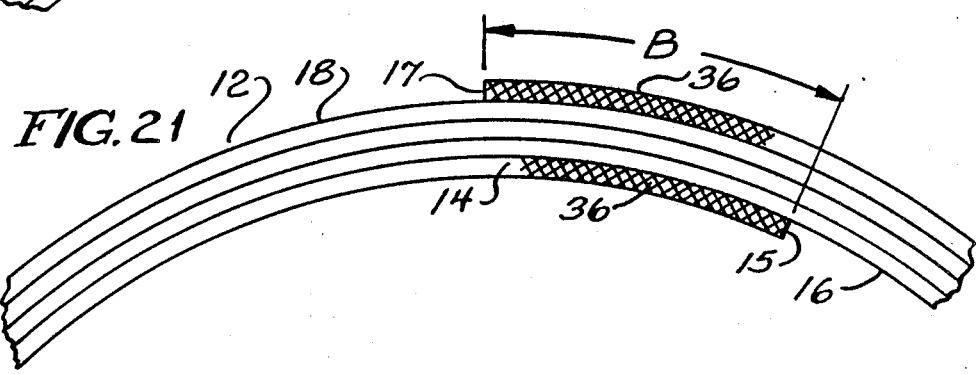
FIG. 21 is a fragmentary axial plan view of a 4×4 rubberless wire tire bead assembly showing the wire termination ends of the wire member being knurled to increase the surface area thereof to reduce the overlap from the inner and outer termination ends to provide a strength efficient tire bead assembly in accordance with the present invention.

FIG. 21 illustrates a rubberless 3×3 tire bead construction wherein the inner termination end 15 and the outer termination end 15 includes a portion 36 adjacent the ends thereof which are knurled or otherwise roughened. Such knurling or roughening results in a reduced overlapped length B, as shown in FIG. 21, which thereby reduces the amount of material necessary to be utilized in constructing the rubberless tire bead assembly 12 and reduces the amount of out-of-balance. The knurling, roughening or threading of the wires, adjacent the ends thereof, provides an increased adhesion surface area so as to provide increased resistance to the pullout force in the overlapped region B. Moreover, it is within the scope of the present invention to provide that the entire length of wire element 14 utilized in constructing the rubberless tire bead assembly 12 in accordance with the present invention may be roughened or knurled to increase the adhesion surface area with respect to the wire bead assembly and the tire carcass material that surrounds the bead when the bead is placed in the tire during the tire building operation.

Figure 22:
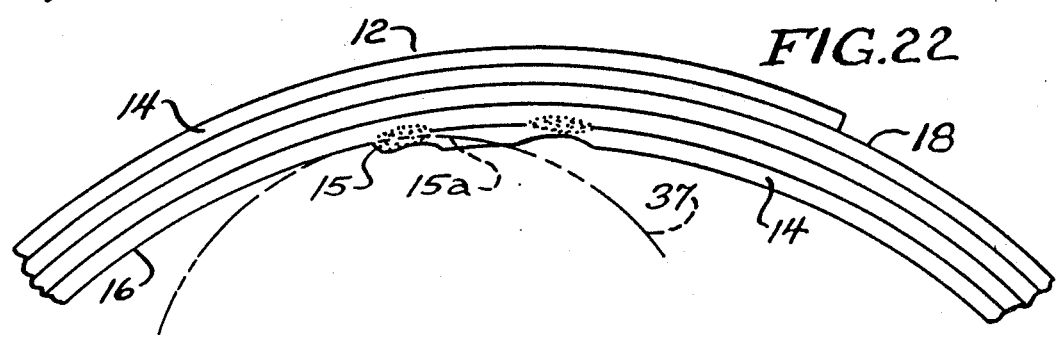
FIG. 22 is a fragmentary axial plan view of a 4×4 rubberless tire bead assembly wherein the inner termination end positioned on the inner diameter of the tire bead assembly is mechanically ground to provide a tapered wire termination end in accordance with the present invention.

FIG. 22 illustrates the incorporation of my co-pending application Ser. No. 085,642, filed Aug. 13, 1987 now U.S. Pat. No. 4,820,563, which discloses the specialized treatment of the bead wire ends when they are positioned within a tire bead assembly. Specifically, FIG. 22 illustrates a rubberless tire bead assembly having an inner termination end 15 and an outer termination end 17, with the inner termination end 15 positioned on the tire bead inner diameter surface 16. As shown in FIG. 22, a grinder or other mechanical means 37 is utilized to engage the inner termination end 15 to grind the same to provide a tapered portion 15a thereon or to otherwise provide an angle cut on the tire bead end 15 to eliminate the sharp defined stress point or contact point between the wire termination end 15 and the inner peripheral surface 16 of the tire bead assembly.

Figure 23:
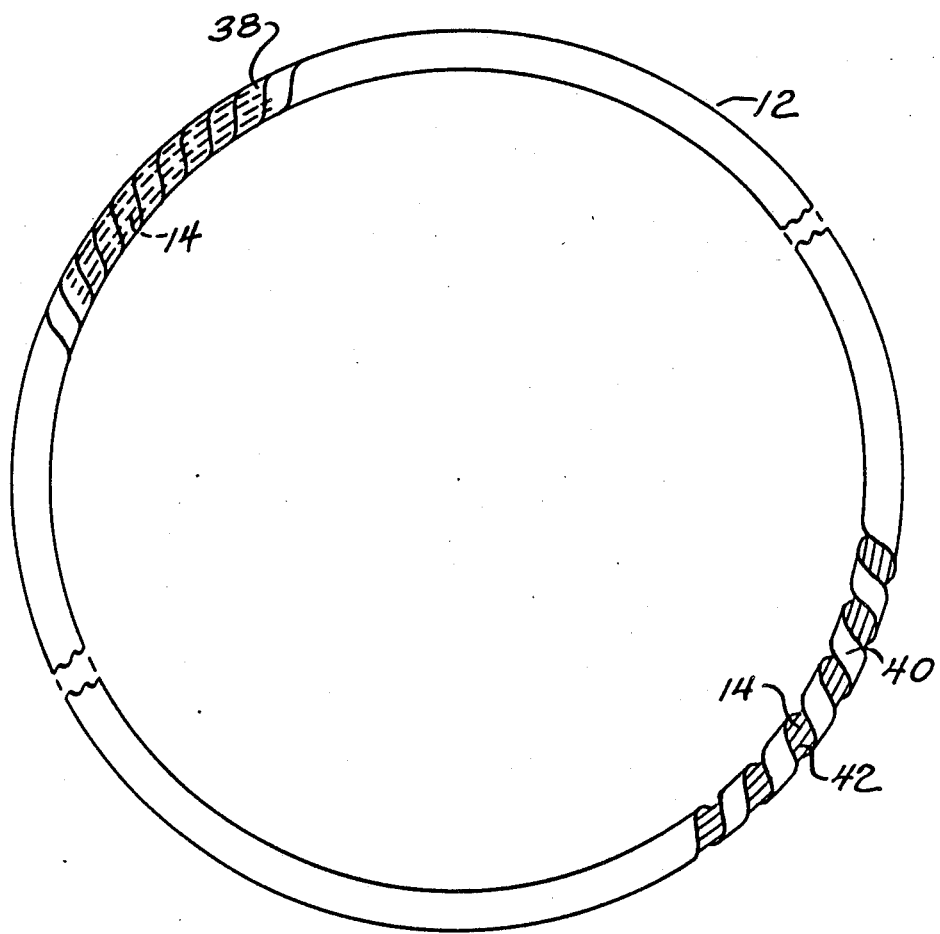
FIG. 23 is a side plan view of a rubberless tire bead assembly showing means for engaging, such as, a close spiral fabric wrapping and a spaced spiral fabric wrapping which retains the tire bead assembly in a planar configuration and the wire elements in contact with each other in accordance with the present invention.

FIG. 23 is an axial plan view of a rubberless tire bead assembly 12 in accordance with two additional embodiments of the present invention. Specifically, FIG. 23 discloses and illustrates a close spiral fabric wrapping 38 which is wrapped continuously about the tire bead assembly 12 or bead hoop to retain the convolutions of either the single wire or plurality of wires comprising the tire bead array in substantial contact with one another to retain the bead assembly in a plane perpendicular to the bead axis of revolution. As shown also in FIG. 23, a spiral-fabric wrapping 40 having gaps 42 therebetween is disclosed and continuously wrapped about the circumference of the tire bead assembly 12 or bead hoop to retain the convolutions of either the single wire or plurality of wires comprising the bead array in substantial contact with one another and to retain the bead assembly in a plane perpendicular to the bead axis of revolution. The continuous shape-retaining means, as disclosed in FIGS. 16, 17, and 23, may well be applied in a subsequent application after the bead assembly has first been formed and bound using precursor clip members, as shown in FIGS. 6–12. The embodiments of the present invention, as disclosed in FIG. 23, as well as the embodiments of the present invention shown in FIGS. 16 and 17, show continuous bonding methods that continually engage the wire elements 14 throughout the bead assemblies circumferential length thereof to retain the tire bead assembly in a plane while at the same time maintaining the substantially round wire elements 14 in a parallel nonvariable cross sectional geometry with the elongated wire axis being parallel to one another and parallel from convolution to convolution. In such a condition, the elongated wire element 14 surfaces are in contact with adjacent convolutions such that void volumes exist between the wire elements. It is understood that a variety of wrapping materials such as tapes, films, wires can be employed advantageously.

Figure 24:
FIG. 24 is a fragmentary axial plan view of a rubberless tire bead assembly showing the inner termination end or ends on the inside diameter surface of the tire bead assembly being rounded in accordance with the present invention.
Figure 25:
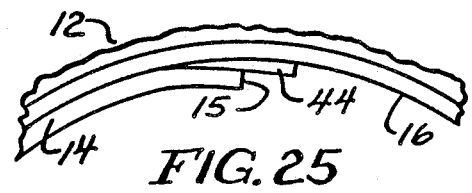
FIG. 25 is a fragmentary axial plan view of a rubberless tire bead assembly showing a cushion positioned between the inner termination end or ends and the inside diameter surface of the tire bead assembly in accordance with the present invention.
Figure 26:
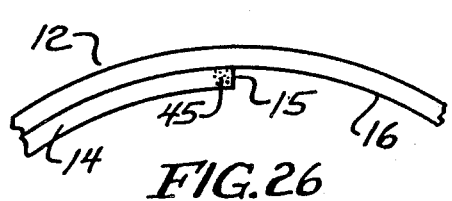
FIG. 26 is a fragmentary axial plan view of a rubberless tire bead assembly showing the softening or heat treatment of the inner termination end or ends and the inside diameter surface of the tire bead assembly in accordance with the present invention.
Figure 27:
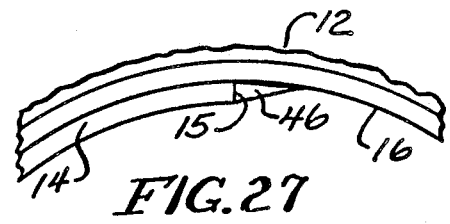
FIGS. 27 is an axial plan view of a rubberless tire bead assembly showing a wedge means positioned at the termination end or ends and the inside diameter surface of the tire bead assembly in accordance with the present invention.

FIG. 24 illustrates a rubberless tire bead assembly 14 in accordance with the present invention wherein the inner termination end 15 of the wire element or elements 14 is mechanically rounded at the point where the inner bead termination 15 engages the inner peripheral diameter surface 16 of the tire bead assembly 12. FIG. 25 illustrates a rubberless tire bead assembly 14 having a cushioning material or means 44 positioned between the tire bead end 15 and the tire bead inner diameter surface 16. The cushioning material may be rubber, reinforced fabric material or even a metal, such as aluminum strip. FIG. 26 illustrates a rubberless tire bead assembly 12 wherein the tire bead end 15 is mechanically softened 45 by heat or flame treatment to soften the inner tire bead end 15 at the point where the end or ends engage the tire bead inner diameter surface 16 of the assembly 12. FIG. 27 illustrates a rubberless tire bead assembly 12 in accordance with the present invention wherein the inner termination end or ends 15 of the wire element 14 includes a wedge means or member 46 positioned against or adjacent to the termination end or ends 15 to reduce the stress concentration between ends 15 and the tire bead inner diameter surface 16 of the tire bead assembly 12.

Figure 28:
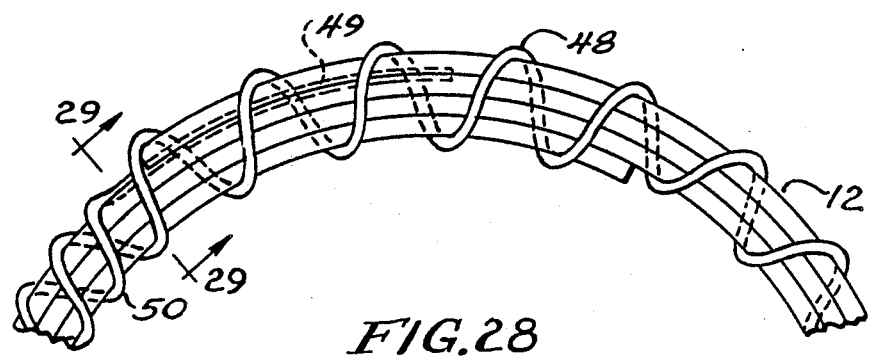
FIG. 28 is a fragmentary axial plan view of a 3×3 tire bead assembly showing a high strength elongated wrap material having a portion anchored internal to the bead assembly and a portion, external and wrapped around the bead assembly to retain the wire surfaces in substantial contact with each other that such void volumes exist between the wire elements in with the present invention.
Figure 29:
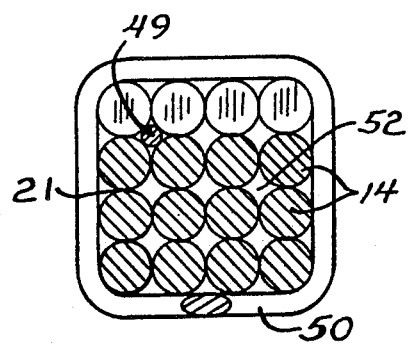
FIG. 29 is an elarged cross-sectional view taken along lines 29—29 of FIG. 28.

FIGS. 28 and 29 illustrate a multiple wire 14 3×3 rubberless tire bead assembly 12 which includes an elongated wrap material 48 having a portion 49 of the elongated wrap material anchored internal to the bead wire array and a portion 50 external to the bead assembly. During manufacture of the 3×3 tire bead assembly 12, the portion 49 of the elongated wrap material internal to the bead assembly is anchored to an interstice 52 between the wires at the final wrap ending of the 3×3 bead construction and the remaining portion 50, external to the bead construction, is continuously and spirally wrapped about the entire bead circumference to retain the entire bead assembly in a plane perpendicular to the bead axis of revolution while having void volumes 19 within the bead assembly. The elongated wrap material 48 may be a bonding agent, such as a soldered coated steel wire or an extension of the wire element 14. The wrap material may also be a polymeric, glass, metal, or natural fiber material which is compatible with the cured tire carcass when a bead assembly 12 is subsequently used in the tire building process.

Figure 30A:
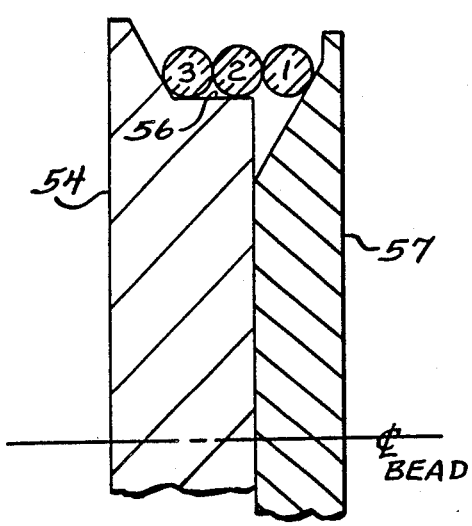
FIGS. 30a–30d are schematic sequential drawings illustrating the method of forming a 2-3-2 rubberless single wire tire bead assembly with the inside diameter surface of the bead assembly free of a wire termination end in accordance with the present invention.
Figure 30B:
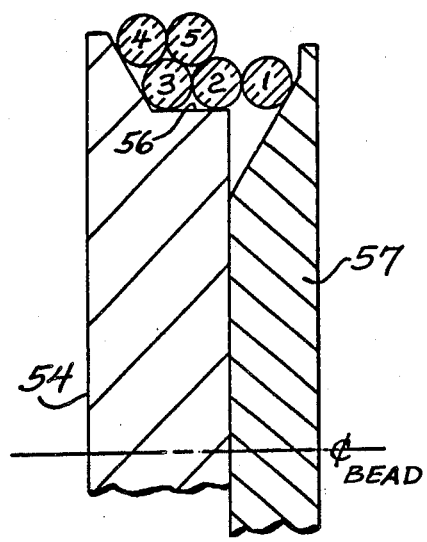
Figure 30C:
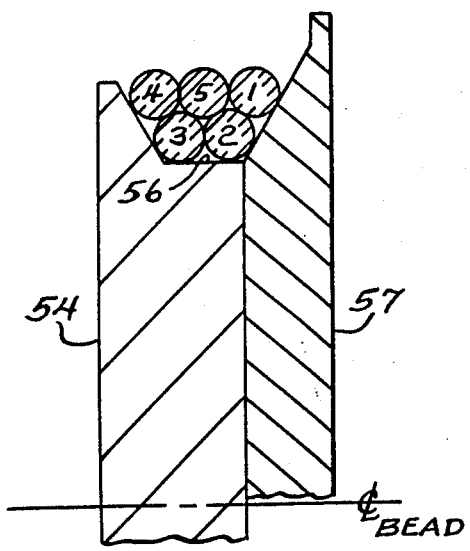
Figure 30D:
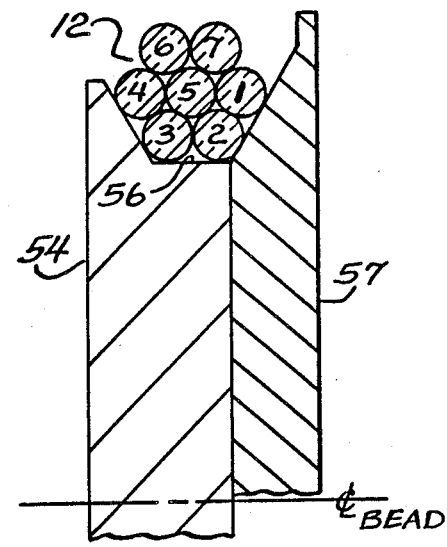

FIGS. 30a–30d schematically illustrate a forming method for the manufacture of a 2-3-2 rubberless tire bead assembly wherein the internal inner diameter surface 16 of the tire bead assembly 12 is free of the inner termination end 15 of the wire element 14. The bead former 54 includes a rotatable cylindrical mandrel surface 56 and a radially expandable rotatable mandrel 57. The bead former is rotated three revolutions to position or deposit convolutions 1, 2 and 3 of the wire element 14 into the former, the position as shown in FIG. 30a. After two more revolutions of the former 54, convolutions 4 and 5 are deposited on the former, as shown in FIG. 30b. At the beginning of the sixth revolution of the former, the expandable mandrel 57 is radially moved outwardly to position and move wire convolution 1 into the same level as convolutions 4 and 5, as shown in FIG. 30c. After the seventh revolution of the former, convolutions 6 and 7 are added to complete the 2-3-2 rubberless tire bead assembly. Importantly, the termination ends 15 and 17 are contained in convolution 1 and in convolution 7 and located in adjacent convolutions or positions, as shown in FIG. 30d. The termination ends 15 and 17 may be fastened one to the other by welding, brazing, soldering, gluing or ferruling. Thereafter, the formed tire bead assembly has applied to it the shape-retaining means as previously described to complete a bead assembly having an inner diameter surface free of any termination ends.

Figure 31A:
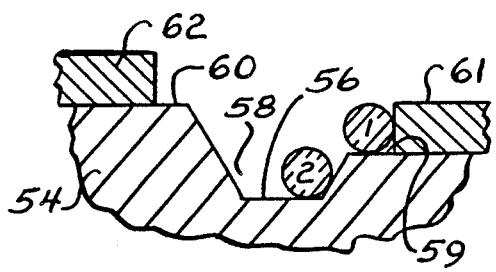
FIGS. 31a–31f are schematic sequential drawings illustrating the method of forming a 2-3-2 rubberless tire bead assembly from a single wire with the inside diameter surface of the tire bead assembly free of a wire termination end and wherein one of the wire termination ends is positioned internal within the bead assembly in accordance with the present invention.
Figure 31B:
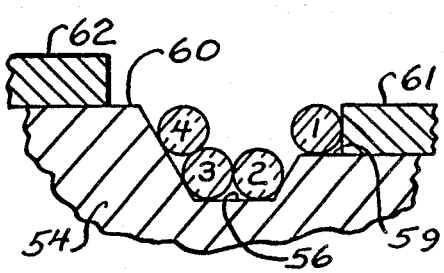
Figure 31C:
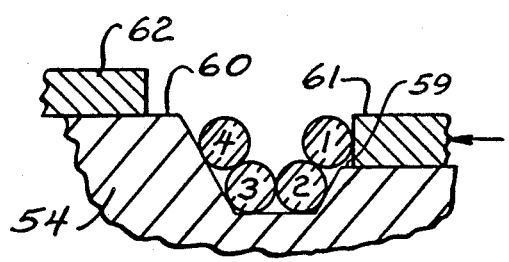
Figure 31D:
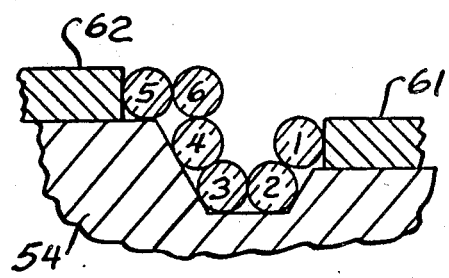
Figure 31E:
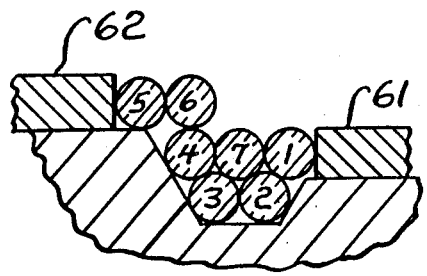
Figure 31F:
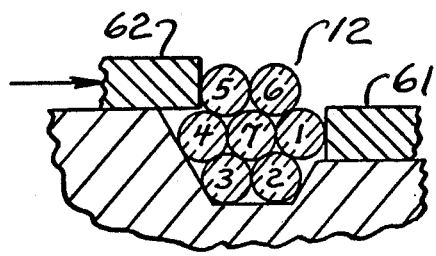

FIGS. 31a–31f schematically illustrate the method for forming a 2-3-2 single wire rubberless tire bead assembly 12 from the a single wire 14 wherein the resultant rubberless tire bead assembly has the tire bead inner diameter surface 16 free of any wire termination ends and wherein the tire bead assembly 12 includes at least one wire termination end positioned internally with respect to the tire bead assembly 12. As shown in FIG. 31a, the expandable forming device includes a V-shaped cavity 58 annularly and radially positioned to provide a segmented cylindrical surface 56. The cavity 58 includes a first shoulder 59 and a second shoulder 60 which cooperate with movable members 61 and 62, as will hereinafter be described. As shown in FIG. 31a, the first wire convolution 1 is positioned on the first shoulder 59 and the second wire convolution 2 is positioned within the cavity 58, after two revolutions of the forming device 54. After two additional revolutions of the forming device, wire convolutions 3 and 4 are deposited on the cylindrical mandrel surface 56 FIG. 31b and FIG. 31c shows the simultaneous axial movement of the first movable member 61 to engage wire convolution 1 such that the surface of the wire 1 contacts wire convolution 2. FIG. 31d shows that the wire convolution 5 is deposited on the second shoulder 60 and then wire convolution 6 is positioned above wire convolution 4 after two additional revolutions of the former 54. As shown in FIG. 31e, the final revolution of the former 54 positions wire convolution 7 between wires 1 and 4. Thereafter, the movable member 62 is actuated and axially positions wires 5 and 6 in a dense packed arrangement wherein the wire surfaces are touching with interstitial void volumes between the convolutions of the wires to complete the 2-3-2 rubberless single wire tire bead assembly, as shown in FIG. 31f. In such a tire bead assembly, the outer end termination 17 of the wire or convolution 7 is positioned internal with respect to the body of the tire bead assembly 12 and the inner tire bead inner diameter surface 16 is free of any wire termination ends. Thereafter the formed tire bead assembly has applied to i&t the shape retaining means 20 to complete the bead assembly 12, as has been previously described.

Figure 32A:
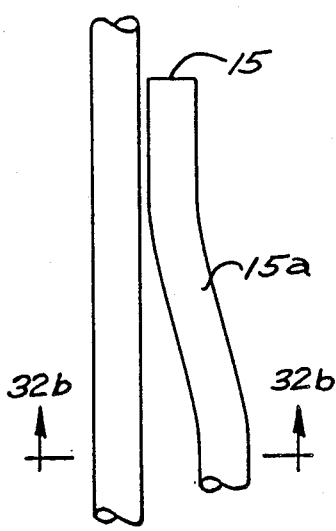
FIGS. 32a–32f are schematic sequential drawings illustrating the method of forming a 2-3-2 rubberless tire bead assembly from a single wire wherein both wire termination ends are positioned internal within the tire bead assembly in accordance with the present invention.
Figure 32C:
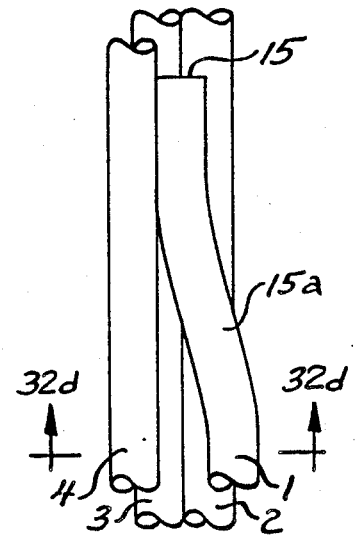
Figure 32B:
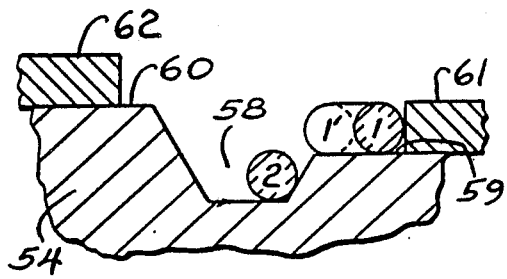
Figure 32D:
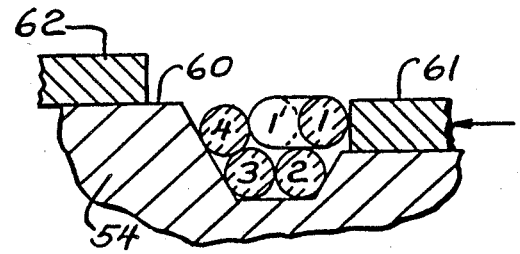
Figure 32E:
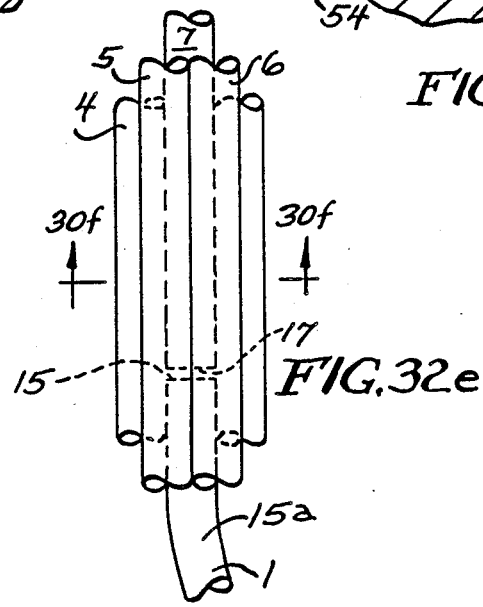

FIGS. 32a-32f disclose a method of manufacturing a 2-3-2 2 rubberless single wire tire bead assembly 12 from a single wire element wherein the wire termination ends 15 and 17 of the single wire are positioned internal with respect to the body of the bead assembly and wherein the tire bead inner diameter surface 16 is free of any wire termination ends. The tire bead forming apparatus is similar to the apparatus disclosed with respect to the method disclosed in FIGS. 31a-31f. As shown in FIG. 32b, the wire convolution 1 is positioned on the first shoulder 59 of the tire bead former 54 with the starting termination end 15 bent inwardly at 15a, as shown from the top view in FIG. 32a. After the first and second revolution of the former, wire convolution 1 is positioned on the first shoulder 59 and wire convolution 2 is positioned within the V-shaped cavity 58, as shown in FIG. 32b and FIG. 32a. FIG. 32d represents the depositing of wire convolutions 3 and 4 after two additional revolutions of the former and the simultaneous axial movement of convolution 1 by movable member 61 array such that the bent termination portion 15a positions termination end 15 in the center of the bead array.

Figure 32F:
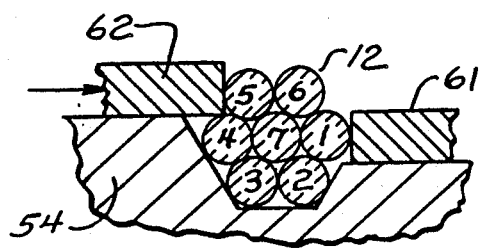

After two additional revolutions of the former, wire convolutions 5 and 6 are positioned, as shown in FIG. 32d. On the seventh revolution of the former, wire convolution 7 is positioned within the tire bead array as shown in FIG. 32c. The inner termination end 15 of convolution 1 and the outer termination end 17 of convolution 7 are substantially in abutting relationship, as shown in dotted lines in FIG. 32e. The ends abut one another in a location which is internal to the bead assembly or array and wherein the resultant bead assembly has all surfaces free of any wire termination ends. If desired, after the formation of the bead assembly in such a manner, it may be desired to spot weld chemically bond, mechanically join, etc., the end terminations 15 and 17 together to firmly retain the ends in abutting relationship to provide a unitary rubberless tire bead assembly. Thereafter member 62 is axially moved to engage convolutions 5 and 6 to position the same about convolution 7, to the position as shown in FIG. 32f and the top view in FIG. 32e. After the tire bead assembly 12 has been formed, the various types of shape-retaining means may be applied to the formed bead assembly to retain the bead assembly in a plane perpendicular to the bead axis of revolution for subsequent use in making a tire.

Figure 33A:
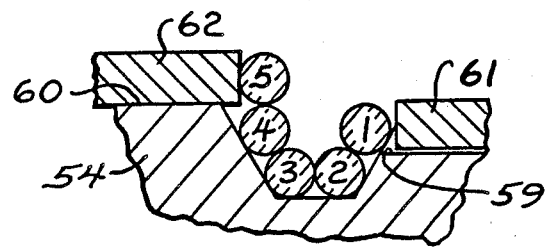
FIGS. 33a–33c are schematic sequential drawings illustrating the method of forming a six wire noncompact rubberless tire bead assembly formed from a single wire having the wire termination ends positioned internal or along the sidewall of the tire bead assembly and held in symmetrical orientation by the periodic positioning of clip members about the circumference of the bead assembly in accordance with the present invention.
Figure 33B:
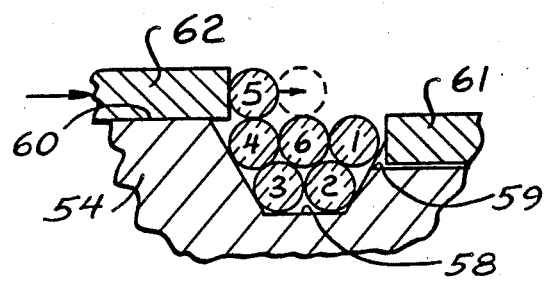
Figure 33C:
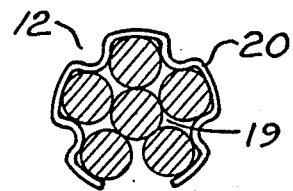

FIGS. 33a-33c schematically illustrate a method of forming and manufacturing a six-wire, non-compact or non-dense tire bead assembly 12 (FIG. 33c) having at least one wire termination end internal to the bead assembly and wherein each of the wires are held in symmetrical orientation by periodically placing profile shape-retaining means 20 around the bead circumference to retain the completed tire bead assembly 12 in a plane perpendicular to the bead axis of revolution. In making the six-wire, non-compact rubberless single wire tire bead assembly 12, as shown in FIG. 33c, the first four revolutions of the former 54 are made sequentially in the same manner as the method disclosed in FIGS. 31a-31c, wire convolution 1 is placed on intermediate flange 59, wrap number 2 is placed in the forming groove, as shown in FIG. 31a, wire convolution 3 is positioned adjacent to wire convolution 2 within the groove and then wire convolution 4 positioned outwardly of the groove, as shown in FIG. 31b. As convolution 4 is being completed, the intermediate flange and associated piston or cam positions wire convolution 1 adjacent to wire convolution 2, the position as shown in FIG. 31c. The movable member 62 is to permit the alignment of wire convolution 5 substantially over wire convolution 4, the position as shown in FIG. 33a. Thereafter, the final revolution of the former 54 deposits wire convolution 6 internally of the tire bead assembly 12. When convolution 6 is completed, the member 62 is axially moved to position and move wire convolution 5 substantially centering the same upon wire convolution 6 to complete tire bead assembly, as shown in the dotted line in FIG. 33b. At this point in the assembly the wire convolution 1 would have a termination end externally on the sidewall of the tire bead assembly and the outer termination end of wire convolution 6 would be positioned internally within the bead assembly. After the six-wire, rubberless, non-compact tire bead assembly has been so formed, profiled shape-retaining means 20 are positioned around the bead circumference to retain the bead assembly 12 in a planar configuration, as shown in FIG. 33c. The profiled shape-retainer means or member 20 provides that the elongated wire element axis 1-6 are retained parallel relative to one another and in parallel from convolution to convolution with the elongated element surfaces in direct contact with each other such that void volumes 19 exist between the wire elements to complete the six-wire, non-compact, rubberless single wire tire bead assembly 12. Other previously described shape-retaining means are also envisioned as are constructions other than those given as examples.

Figure 34A:
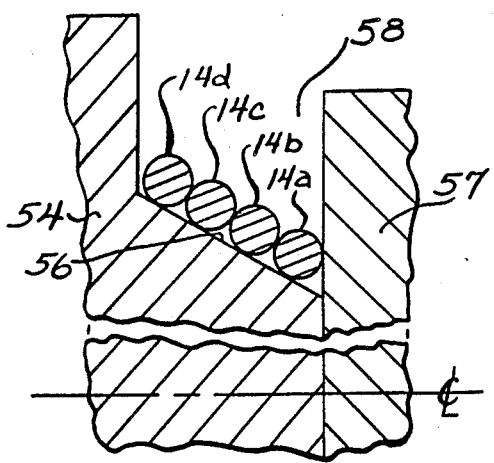
FIGS. 34a–34c are schematic sequential drawings illustrating the method of forming a 4×4 rubberless tire bead assembly containing multiple wires wherein the bead assembly has a tapered bead base and a means for engaging the circumference of the tire bead assembly to retain the 4×4 rubberless tire bead assembly in a dense compact condition in accordance with a further embodiment of the present invention.
Figure 34B:
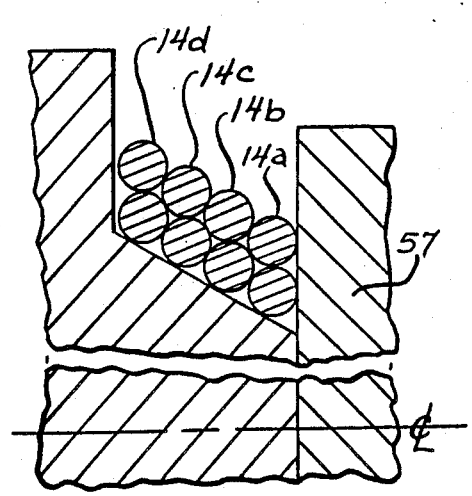
Figure 34C:
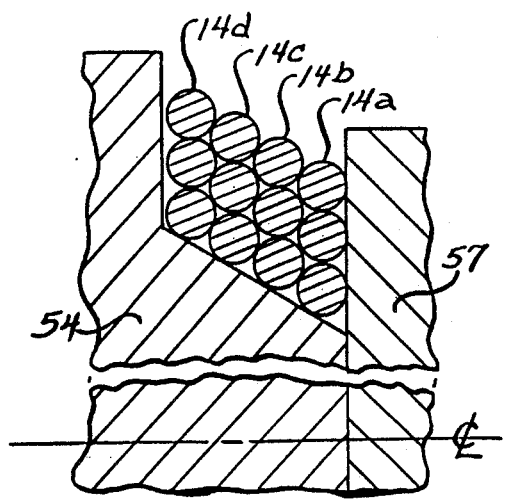
Figure 34D:
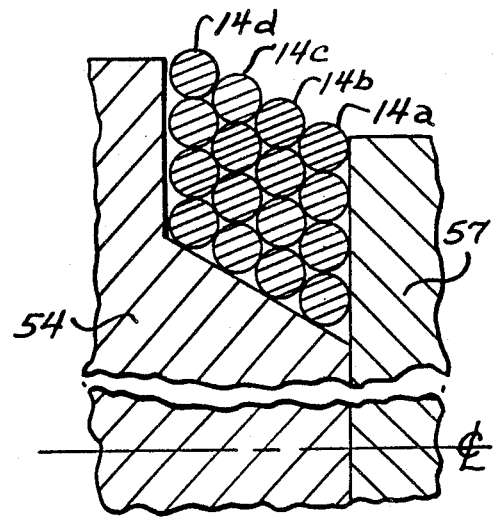
Figure 34E:
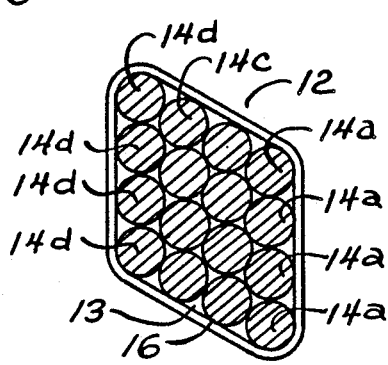

FIGS. 34a-34e schematically illustrate the method of forming a rubberless 4×4 tire bead assembly 12 utilizing multiple wires 14, with the tire bead assembly having a tapered bead base 13 or a tapered tire bead inner diameter surface 16. The tire bead former 54 includes a tapered radially extending cylindrical surface 56 and radially expandable mandrel 57 which define a tapered cavity 58 therebetween. Rotation of the former permits the placement of four wires 14a-14d simultaneously onto the surface 56 to provide the first row or layer of the single convolutions of the respective four wires 14a-14d into the tapered cavity 58, the position as shown in FIG. 34a. FIG. 34b illustrates the revolution of the former wherein the four wires 14a-14d provide an overlapping second row or layer of wires. As illustrated in FIG. 34c, the third wrapping of the respective four wires 14a-14d upon themselves provides a third row or layer of the tire bead assembly. The final and fourth row of the respective four wires 14a-14d is wrapped upon themselves to complete the multiple wire tire bead assembly 12 having a tapered base or inner diameter surface 16, as shown in FIG. 34d. After the final convolutions of the respective multiple wires are positioned and wrapped on the former, shape-retaining means 20, as described above, engage the tire bead assembly 12, to provide the completed multiple wire 4×4 tapered base tire bead assembly 12, as shown in cross-section in FIG. Such a multiple wire tapered base construction is novel because it is not possible to make a tapered base tire assembly wherein multiple wires are contained in a rubber ribbon of tape material as known and disclosed in the prior art and explained previously. The unique tire bead assembly 12 of the present invention provides a dense packed, 4×4 construction, wherein the tapered inner diameter 16 of the bead assembly will include tire bead inner termination ends 15 on the inside surface thereof, which may be treated by mechanical deformation, heat softening treatment or the utilization of cushioning means between the inner termination ends and the tire bead inner diameter surface 16, as disclosed in FIGS. 22, 24-27, to improve the strength efficiencies of such rubberless tire bead assemblies.

One method of making a tire bead assembly comprised of a plurality of wires is illustrated in FIGS. 35a-35c. The tire bead former 54 is identical to the former disclosed in FIGS. 34a-34e, except it is includes a cylindrical mandrel surface 56, as previously disclosed. The 4×4 multiple wire tire bead assembly 12 is manufactured by rotating the former one revolution and simultaneously feeding four wire elements 14a-14d onto the cylindrical surface 56, as shown in FIG. 35a. FIG. 35b represents the feeding of two convolutions of the four wire elements 14a-14d onto surface 56 and FIG. 35c illustrates the feeding of four convolutions of the four wire elements onto the surface 56. Thereafter, the rubberless tire bead assembly 12 will be engaged with the shape-retaining means 20 to complete the multiple wire 4×4 rubberless tire bead assembly. Because the assembly will have four termination ends 15 on the inner diameter surface 16 of the tire bead, the ends 15 may be mechanically deformed, heat treated or cushioning means positioned between the ends 15 and the inner surface of the tire bead assembly, as has been disclosed in FIGS. 22 and 24-27.

Furthermore, it should be apparent that multiple wire bead assemblies such as the 4×4 construction described above and in FIG. 35c may be readily produced with the resultant tire bead assembly having at least some of the wire end terminations internal to the wire array by utilizing forming drums having movable elements and temporary wire position locating shoulders similar to those described in FIGS. 30, 31, 32, and 33 for single wire bead assemblies. As is apparent, the tire assembly would have the inner diameter surface free of end terminations, with some of the end terminations positioned internal to the completed tire bead assembly.

FIGS. 36a-36c illustrate another method of making a 4×4 rubberless tire bead assembly 12 containing multiple wires 14a-14d in accordance with the present invention. As shown in FIG. 36a, one revolution of the former 54 permits multiple wires 14a, 14b, 14c, and 14d to be simultaneously wrapped around the cylindrical surface 56 to provide a first layer extending radially outwardly. FIG. 36b represents the addition of a second layer, wires 14a-14b, axially positioned on the former 54, and FIG. 36c represents the addition of the fourth layer, 14a-14d, to complete the 4×4 multiple wire, rubberless tire bead assembly 12. As shown in FIG. 36c and in FIG. 37, the outer termination ends 17 of the wire elements 14a-14d are positioned on the sidewall 27 of 4×4 rubberless tire bead assembly 12 and the inner tire bead inner diameter surface 16 is free of any termination ends. Such a tire bead assembly is not possible utilizing the ribbon-type, rubber-coated wire elements in accordance with the prior art because the prior art strengthening elements do not permit the simultaneous feeding of each of the respective wires in both a radial and an axial direction, a result which can be achieved utilizing the present invention. It should be apparent that a multitude of constructions other than the 4×4 construction of this example are possible.

Additionally, the novel rubberless tire bead construction utilizing multiple bead wires in accordance with the present invention provides that in each convolution of the wire element, or elements the surfaces of each wire are in contact with each other over substantially the entire circumference of the bead assembly while providing for void volumes 19 within the completed tire bead assembly. After completion of the assembly as shown in FIG. 36c, shape-retaining means are positioned periodically about the bead circumference to retain the completed multiple were 4×4 wire bead assembly 12 in a planar configuration for subsequent use in manufacturing a tire.

It is also within the scope of the present invention that the method of simultaneously depositing a plurality of multiple wires axially to provide a multiple wire tire bead assembly may be used in manufacturing the tapered base 4×4 tire bead assembly, as shown in FIGS. 34a-34d. In such an instance, the end terminations of the last wrap would be on the sidewall of the tapered 4×4 tire bead assembly and the resultant assembly would not possess any termination ends positioned on the tapered inner diameter surface 16, as is present in the tapered 4×4 tire bead assembly of FIGS. 34a-34d.

The strength efficiency of tire bead assemblies in accordance with the present invention has resulted in tire bead assemblies possessing strength efficiencies substantially equivalent to conventional round wire beads having a rubber bonding or coating on the wires.

The practical advantages of eliminating the rubber coating from the tire bead assembly includes eliminating the cost of the bead rubber coating and results in improved manufacturing operations such as higher cycle speeds, increased productivity during the bead making operation, and elimination of concern about the shelf life, or aging, of beads.

The methods of simultaneously feeding multiple wires free of any rubber coating thereon permits the manufacture of symmetrical and densely packed tire bead assemblies which have tapered inner diameter tire bead surfaces. The manufacturing of rubberless tire bead assemblies having the wire termination ends positioned internal to the tire bead assembly or on the sidewall of the tire bead assembly has heretofore been unknown. The uniformity of weight distribution around the rubberless tire bead assembly having wire termination ends positioned internally should be much improved over state-of-the-art beads containing rubber coatings and overlap regions.

I claim:

1. A tire bead assembly comprising:

a predetermined length of a single wire having two ends thereon substantially free of an envelope of rubber-type materials extending along its length and wound about an axis to provide a plurality of convolutions of said single wire to provide a bead hoop, with each convolution of said single wire in substantially wire-to wire contact with at least one adjacent convolution of said single wire and positioned substantially in a plane parallel to the other convolutions of said single wire to provide a tire bead assembly having an inside diameter surface, an outside peripheral surface and sidewall surfaces, with at least one end of said predetermined length of single wire located on one of said surfaces of said tire bead assembly, and shape-retaining means engageable with at least a portion of said plurality of convolutions of said single wire of said tire bead assembly, said shape-retaining means engaging a substantial portion of the perimeter of said bead hoop cross-section and engaging at least a portion of the circumference of said bead hoop of said bead assembly to retain the bead assembly in planar configuration perpendicular to the axis of revolution of said bead hoop and to retain each convolution of said single wire in substantially wire-to-wire contact with at least one adjacent convolution of said single wire to provide for void volumes within said bead assembly to permit entrapped air to be dissipated and minimized during a tire building operation.

2. The tire bead assembly in accordance with claim 1 wherein said shape retaining means is a mechanical member.

3. The tire bead assembly in accordance with claim 2, wherein said mechanical member is a clip member periodically spaced about the circumference of the bead hoop.

4. The tire bead assembly in accordance with claim 3, wherein said clip member is preformed to conform to the profile of said bead wire array and periodically spaced about the circumference of the bead hoop.

5. The tire bead assembly in accordance with claim 2, wherein said mechanical member is a wire tie member periodically spaced about the circumference of the bead hoop.

6. The tire bead assembly in accordance with claim 2 wherein said mechanical member is a spiral-shaped spring clip member.

7. The tire bead assembly in accordance with claim 2 wherein said mechanical member is a fabric tape material wrapped about and engaging at least a portion of the circumference of said bead hoop.

8. The tire bead assembly in accordance with claim 2 wherein said mechanical member is a moldable polymeric material encapsulating at least a portion of the circumference of said bead hoop of said tire bead assembly.

9. The tire bead assembly in accordance with claim 1, wherein said shape-retaining means is a predetermined length of an elongated material continuously wrapped and engaging at least a portion of the circumference of said bead hoop to retain the tire bead assembly in a planar configuration.

10. The tire bead assembly in accordance with claim 9 wherein said predetermined length of said elongated material includes one end thereof anchored between the wire convolutions within the bead hoop.

11. The tire bead assembly in accordance with claim 1, wherein said shape-retaining means is effected by chemical bonding.

12. The tire bead assembly in accordance with claim 11, wherein said chemical bonding is by welding at least portions of said convolutions of said single wire to each other.

13. The tire bead assembly in accordance with claim 11, wherein said chemical bonding is an adhesive material deposited on at least a portion of said plurality of convolutions of said single wire to bond convolutions of said single wire to each other.

14. The tire bead assembly in accordance with claim 11 wherein said predetermined length of a single wire contains a fusible material deposited thereon and said chemical bonding is by activating said fusible material to bond at least portions of said convolutions of said single wire to each other.

15. The tire bead assembly in accordance with claim 11 wherein said chemical bonding is by brazing at least portions of said convolutions of said single wire to each other.

16. The tire bead assembly in accordance with claim 11, wherein said chemical bonding is by soldering at least portions of said convolutions of said single wire to each other.

17. The tire bead assembly in accordance with claim 1 wherein said single wire is nominally circular in cross-section and includes said one said end of the predetermined length of said single wire positioned and engageable with said inside diameter surface of the tire bead assembly.

18. The tire bead assembly in accordance with claim 17 wherein said one end of said predetermined length of said single wire is mechanically deformed to minimize the stress concentration between said one end of the predetermined length of said single wire and said inside surface of the tire bead assembly.

19. The tire bead assembly in accordance with claim 18 wherein said mechanical deformation is done by tapering said one end of said predetermined length of said single wire.

20. The tire bead assembly in accordance with claim 19 wherein said tapering said at least one end of said predetermined length of said single wire is done by grinding.

21. The tire bead assembly in accordance with claim 18 wherein said mechanical deformation is done by angle cutting.

22. The tire bead assembly in accordance with claim 18 wherein said mechanical deformation is done by swagging.

23. The tire bead assembly in accordance with claim 18 wherein said mechanical deformation is done by machining.

24. The tire bead assembly in accordance with claim 18 wherein said a mechanical deformation is done by rounding said at least one end of said predetermined length of said single wire.

25. The tire bead assembly in accordance with claim 17 wherein said at least one end of said predetermined length of said single wire is softened by heat treatment to minimize the stress concentration between said at least one end of the predetermined length of said single wire and said inside diameter surface of the tire bead assembly.

26. The tire bead assembly in accordance with claim 25 wherein said heat treatment is done by brazing said at least end to said inside diameter surface of the bead assembly.

27. The tire bead assembly in accordance with claim 25 wherein said heat treatment is done by soldering said at least end to said inside diameter surface of the bead assembly.

28. The tire bead assembly in accordance with claim 25 wherein said heat treatment is done by welding said at least end to said inside diameter surface of the bead assembly.

29. The tire bead assembly in accordance with claim 17 wherein said at least one end of said predetermined length of said single wire includes a cushioning means positioned between said at least one end of said predetermined length of said single wire and said inside diameter surface of the tire bead assembly to minimize the stress concentration between said at least one end of the predetermined length of said single wire and said inside diameter surface of the tire bead assembly.

30. The tire bead assembly in accordance with claim 29 wherein said cushioning means is a rubber based material.

31. The tire bead assembly in accordance with clam 29 wherein said cushioning means is a reinforced fabric material.

32. The tire bead assembly in accordance with claim 29 wherein said cushioning means is a metal.

33. The tire bead assembly in accordance with claim 1, wherein said tire bead assembly is a dense packed 2-3-2 construction.

34. The tire bead assembly in accordance with claim 1, wherein the tire bead assembly is a dense packed 3-4-3 construction.

35. The tire bead assembly in accordance with claim 1, wherein the tire bead ring assembly is a dense packed 3-4-5-4-3 construction.

36. The tire bead assembly in accordance with claim 1 wherein said single wire is nominally circular in cross-section and includes one end of the predetermined length of said single wire positioned and engageable with said inside surface of the tire bead assembly and said other end opposite said one end overlapping and engageable with said outside peripheral surface, with each of said ends being mechanically roughened to increase the adhesion of said tire bead assembly.

37. The tire bead assembly in accordance with claim 1 wherein said predetermined length of said single wire is mechanically roughened to increase the adhesion of said tire bead assembly.

38. The tire bead assembly in accordance with claim 1 wherein said at least one end of said predetermined length of said single wire is positioned substantially linear and parallel to adjacent convolutions.

39. A tire bead assembly comprising:
a predetermined length of nominally circular cross-sectional single wire having two ends thereon substantially free of an envelope of rubber-type materials extending along its length and wound about an axis to provide a plurality of convolutions of said single wire to provide a bead hoop having a bead wire array therein, with each convolution of said single wire in substantially wire-to-wire contact with at least one adjacent convolution of said single wire and positioned substantially in a plane parallel to the other convolutions of said single wire to provide a tire bead assembly having an inside diameter surface, an outside peripheral surface and sidewall surfaces, with at least one end of said predetermined length of single wire positioned internally with respect to said bead wire array, and shape-retaining means engageable with at least a portion of said plurality of convolutions of said single wire of said tire bead assembly, said shape-retaining means engaging a substantial portion of the perimeter of said bead hoop cross-sections and engaging at least a portion of the circumference of said bead hoop of said bead assembly to retain the bead assembly in a planar configuration perpendicular to the axis of revolution of said bead hoop, to retain adjacent convolutions of said single wire in substantially wire-to-wire contact and to provide for void volumes within said bead wire array to permit entrapped air to be dissipated and minimized during a tire building operation.

40. The tire bead assembly in accordance with claim 39 wherein said shape-retaining means is a mechanical member.

41. The tire bead assembly in accordance with claim 40, wherein said mechanical member is a clip member periodically spaced about the circumference of the bead hoop.

42. The tire bead assembly in accordance with claim 4, wherein said clip member is preformed to conform to the profile of said bead wire array and periodically spaced about the circumference of the bead hoop.

43. The tire bead assembly in accordance with claim 40, wherein said mechanical member is a wire tie member periodically spaced about the circumference of the bead hoop.

44. The tire bead assembly in accordance with claim 40 wherein said mechanical member is a spiral-shaped spring clip member periodically spaced about the outer circumference of the bead hoop.

45. The tire bead assembly in accordance with claim 40 wherein said mechanical member is a fabric tape material equally spaced and wrapped about the circumference of the bead hoop.

46. The tire bead assembly in accordance with claim 40 wherein said mechanical member is a moldable polymeric material incapsulating at least a portion of said plurality of convolutions of said single wire of said tire bead assembly.

47. The tire bead assembly in accordance with claim 39, wherein said shape-retaining means is a predetermined length of an elongated material continuously wrapped about the circumference of the bead hoop to retain the tire bead assembly in a planar configuration.

48. The tire bead assembly in accordance with claim 47 wherein said predetermined length of said elongated material includes one end thereof anchored between the wire convolutions within the bead hoop.

49. The tire bead assembly in accordance with claim 39, wherein said shape-retaining means is effected by chemical bonding.

50. The tire bead assembly in accordance with claim 49, wherein said chemical bonding is by welding at least portions of said convolutions of said single wire to each other.

51. The tire bead assembly in accordance with claim 49, wherein said chemical bonding is an adhesive material deposited on at least a portion of said plurality of convolutions of said single wire to bond convolutions of said single wire to each other.

52. The tire bead assembly in accordance with claim 49 wherein said predetermined length of a single wire contains a fusible material deposited thereon and said chemical bonding is by activating said fusible material to bond at least portions of said convolutions of said single wire to each other.

53. The tire bead assembly in accordance with claim 49 wherein said chemical bonding is by brazing at least portions of said convolutions of said single wire to each other.

54. The tire bead assembly in accordance with claim 49, wherein said chemical bonding is by soldering at least portions of said convolutions of said single wire to each other.

55. The tire bead assembly in accordance with claim 39, wherein said single wire includes an end opposite said at least one end of the predetermined length of said single wire positioned and engageable with one of said sidewall surfaces of the tire bead assembly.

56. The tire bead assembly in accordance with claim 39 wherein said single wire includes an end opposite said at least one end of said predetermined length of said single wire positioned internally with respect to said bead wire array and substantially parallel to the axis of the adjacent convolution of wire.

57. The tire bead assembly in accordance with claim 56 wherein each of said ends of said single wire is mechanically connected to said bead wire array.

58. The tire bead assembly in accordance with claim 56 wherein each of said ends of said single wire is chemically bonded to said bead wire array.

59. The tire bead assembly in accordance with claim 56 wherein each of said ends of said single wire is abutting and mechanically connected to one another to provide a strengthened continuity between said ends.

60. The tire bead assembly in accordance with claim 56 wherein each of said ends of said single wire is in abutting relationship and chemically bonded to one another to provide a strengthened continuity between said ends.

61. The tire bead assembly in accordance with claim 39, wherein said tire bead assembly is a dense pack 2-3-2 construction.

62. The tire bead assembly in accordance with claim 39, wherein the tire bead assembly is a dense pack 3-4-3 construction.

63. The tire bead assembly in accordance with claim 39, wherein the tire bead ring assembly is a dense pack 3-4-5-4-3 construction.

64. A tire bead assembly comprising:
a predetermined length of nominally circular cross-sectional single wire having two ends thereon substantially free of an envelope of rubber-type materials extending along its length and wound about an axis to provide a bead hoop having a bead wire array therein, with each convolution of said single wire in substantially wire-to-wire contact with at least one adjacent convolution of said single wire and positioned substantially in a plane parallel to the other convolutions of said single wire to provide a tire bead assembly having an inside diameter surface, an outside peripheral surface and sidewall surfaces, with at least one end of said predetermined length of single wire positioned on one of said sidewall surfaces with respect to said bead wire array, and
shape-retaining means engageable with at least a portion of said plurality of convolutions of said single wire of said tire bead assembly, said shape-retaining means substantially engaging a substantial portion of the perimeter of said bead hoop cross-section and engaging at least a portion of the circumference of said bead hoop of said bead assembly to retain the bead assembly in a planar configuration perpendicular to the axis of revolution of said bead hoop, to retain adjacent convolutions of single wire in substantially wire-to-wire contact and to provide for void volumes within said bead wire array to permit entrapped air to be dissipated and minimized during a tire building operation.

65. The tire bead assembly in accordance with claim 64 wherein said shape-retaining means is a mechanical member.

66. The tire bead assembly in accordance with claim 65, wherein said mechanical member is a clip member periodically spaced about the circumference of the bead hoop.

67. The tire bead assembly in accordance with claim 66, wherein said clip member is preformed to conform to the profile of said bead wire array and periodically spaced about the circumference of the bead hoop.

68. The tire bead assembly in accordance with claim 65 wherein said mechanical member is a wire tie member periodically spaced about the circumference of the bead hoop.

69. The tire bead assembly in accordance with claim 65 wherein said mechanical member is a spiral-shaped spring clip member.

70. The tire bad assembly in accordance with claim 65 wherein said mechanical member is a fabric tape material wrapped and engaging at least a portion of the circumference of the bead hoop.

71. The tire bead assembly in accordance with claim 65 wherein said mechanical member is a moldable polymeric material incapsulating at least a portion of said plurality of convolutions of said single wire of said tire bead assembly.

72. The tire bead assembly in accordance with claim 64, wherein said shape-retaining means is a predetermined length of an elongated material continuously wrapped about the circumference of the bead hoop to retain the tire bead assembly in a planer configuration.

73. The tire bead assembly in accordance with claim 72, wherein said predetermined length of said elongated material includes one end thereof anchored between adjacent wire convolutions within the bead hoop.

74. The tire bead assembly in accordance with claim 64, wherein said shape-retaining means is effected by chemical bonding.

75. The tire bead assembly in accordance with claim 74, wherein said chemical bonding is by welding convolutions at least portions of said of said single wire to each other.

76. The tire bead assembly in accordance with claim 74, wherein said chemical bonding is an adhesive material deposited on at least a portion of said plurality of convolutions of said single wire to bond adjacent convolutions of said single wire to each other.

77. The tire bead assembly in accordance with claim 74 wherein said predetermined length of a single wire contains a fusible material deposited thereon and said chemical bonding is by activating said fusible material to bond at least portions of said convolutions of said single wire to each other.

78. The tire bead assembly in accordance with claim 74 wherein said chemical bonding is by brazing at least portions of said convolutions of said single wire to each other.

79. The tire bead assembly in accordance with claim 74, wherein said chemical bonding is by soldering at least portions of said convolutions of said single wire to each other.

80. The tire bead assembly in accordance with claim 64, wherein said single wire includes an end opposite said at least one end of the predetermined length of said single wire positioned and engageable with one of said sidewall surfaces of the tire bead assembly.

81. The tire bead assembly in accordance with claim 80 wherein each of said ends of said single wire is positioned adjacent to one another on a sidewall surface.

82. The tire bead assembly in accordance with claim 80 wherein each of said ends of said single wire is in abutting relationship and adhesively connected together to provide a strengthened continuity between said ends.

83. The tire bead assembly in accordance with claim 82 wherein said adhesive connection is by brazing.

84. The tire bead assembly in accordance with claim 82 wherein said adhesive connection is by welding.

85. The tire bead assembly in accordance with claim 82 wherein said adhesive connection is by soldering to provide a strengthened continuity between said ends.

86. The tire bead assembly in accordance with claim 80 wherein each of said adjacent ends is mechanically joined together to provide a strengthened continuity between said ends.

87. The tire bead assembly in accordance with claim 64 wherein said at least one end of said predetermined length of said single wire is positioned substantially linear and parallel to adjacent convolutions.

88. A tire bead assembly comprising:
predetermined lengths of nominally circular cross-sectional multiple wires substantially free of an envelope of rubber-type materials extending along their length and wound about an axis to provide a plurality of convolutions of said multiple wires to provide a bead hoop, with each convolution of said multiple wires in substantially wire-to-wire contact with at least one adjacent convolution of said multiple wires and positioned substantially in a plane parallel to the other convolutions of said multiple wires to provide a tire bead assembly having an inside diameter surface, an outside peripheral surface and sidewall surfaces, and
shape-retaining means engageable with at least a portion of said plurality of convolutions of said multiple wires of said tire bead assembly, said shape-retaining means substantially engaging a substantial portion of the perimeter of the bead hoop cross-section and engaging at least a portion of the circumference of the bead hoop to retain the bead assembly in a planar configuration perpendicular tot he axis of revolution of said bead hoop and to retain each convolution of said multiple wires in substantially wire-to-wire contact with at least one adjacent convolution and to provide for void volumes within said bead wire array to permit entrapped air to be dissipated and minimized during a tire building operation.

89. The tire bead assembly in accordance with claim 88 wherein said shape-retaining means is a mechanical member.

90. The tire bead assembly in accordance with claim 89, wherein said mechanical member is a clip member periodically spaced about the circumference of the bead hoop.

91. The tire bead assembly in accordance with claim 90, wherein said clip member is preformed to conform to the profile of said bead wire array and periodically spaced about the circumference of the bead hoop.

92. The tire bead assembly in accordance with claim 89, wherein said mechanical member is a wire tie member periodically spaced about the circumference of the bead hoop.

93. The tire bead assembly in accordance with claim 89, wherein said mechanical member is a spiral-shaped spring clip member periodically spaced about the circumference of the bead hoop.

94. The tire bead assembly in accordance with claim 89, wherein said mechanical member is a fabric tape material periodically wrapped about the circumference of the bead hoop.

95. The tire bead assembly in accordance with claim 89, wherein said mechanical member is a moldable polymeric material incapsulating at least a portion of said plurality of convolutions of said multiple wires of said tire bead assembly.

96. The tire bead assembly in accordance with claim 88, wherein said shape-retaining means is a predetermined length of an elongated material continuously wrapped about the circumference of the bead hoop to retain the tire bead assembly in a planar configuration.

97. The tire bead assembly in accordance with claim 96, wherein said predetermined length of said elongated material includes one end thereof anchored between the wire convolutions within the bead hoop.

98. The tire bead assembly in accordance with claim 88, wherein said shape-retaining means is effected by chemical bonding.

99. The tire bead assembly in accordance with claim 98, wherein said chemical bonding is by welding convolutions of said multiple wires to adjacent convolutions of said multiple wires.

100. The tire bead assembly in accordance with claim 98, wherein said chemical bonding is an adhesively material deposited on at least a portion of said plurality of convolutions of said multiple wires to bond convolutions of said multiple wires to adjacent convolutions of said multiple wires.

101. The tire bead assembly in accordance with claim 98 wherein said predetermined lengths of said multiple wires contain a fusable material and said chemical bonding is by activating said fusable material to bond convolutions of said multiple wires to adjacent convolutions of said multiple wires.

102. The tire bead assembly in accordance with claim 98 wherein said chemical bonding is by brazing convolutions of said multiple wires to adjacent convolutions of said multiple wires.

103. The tire bead assembly in accordance with claim 98, wherein said chemical bonding is by soldering convolutions of said multiple wires to adjacent convolutions of said multiple wires.

104. The tire bead assembly in accordance with claim 88, wherein said multiple wires include one end of the predetermined lengths of said multiple wires positioned and engageable with said inside diameter surface of the tire bead assembly.

105. The tire bead assembly in accordance with claim 104 wherein said one end of said predetermined lengths of said multiple wires is softened by heat treatment to minimize the stress concentration between said one end of the predetermined lengths of said multiple wires and said inside diameter surface of the tire bead assembly.

106. The tire bead assembly in accordance with claim 105 wherein said heat treatment is done by brazing said ends to said inside surface of the bead assembly.

107. The tire bead assembly in accordance with claim 105 wherein said heat treatment is done by soldering said ends to said inside surface of the bead assembly.

108. The tire bead assembly in accordance with claim 105 wherein said heat treatment is done by welding said ends to said inside diameter surface of the bead assembly.

109. The tire bead assembly in accordance with claim 104 wherein said one end of said predetermined length of said multiple wires includes a cushioning means positioned between said one end of said predetermined length of said multiple wires and said inside diameter surface of the tire bead assembly to minimize the stress concentration between said one end of the predetermined length of said multiple wires and said inside diameter surface of the tire bead assembly.

110. The tire bead assembly in accordance with claim 109 wherein said cushioning means is a metal.

111. The tire bead assembly in accordance with claim 109 wherein said cushioning means is a rubber based material.

112. The tire bead assembly in accordance with claim 109 wherein said cushioning means is a reinforced fabric material.

113. The tire bead assembly in accordance with claim 104 wherein said one end of said predetermined lengths of said multiple wires is positioned substantially linear and parallel to adjacent convolutions.

114. The tire bead assembly in accordance with claim 88 wherein said one end of said predetermined lengths of said multiple wires are mechanically deformed to minimize stress concentration between said one end of the predetermined length of said multiple wires and said inside diameter surface of the tire bead assembly.

115. The tire bead assembly in accordance with claim 114 wherein said mechanical deformation is done by tapering said one end of said predetermined lengths of said multiple wires.

116. The tire bead assembly in accordance with claim 115 wherein said tapering said one end of said predetermined lengths of said multiple wires is done by grinding.

117. The tire bead assembly in accordance with claim 114 wherein said mechanical deformation is done by angle cutting.

118. The tire bead assembly in accordance with claim 114 wherein said mechanical deformation is done by swagging.

119. The tire bead assembly in accordance with claim 114 wherein said mechanical deformation is done by machining.

120. The tire bead assembly in accordance with claim 114 wherein said mechanical deformation is done by rounding said one end of said predetermined lengths of said multiple wires.

121. The tire bead assembly in accordance with claim 88 wherein said tire bead assembly is a 3×3 construction.

122. The tire bead assembly in accordance with claim 88 wherein said tire bead assembly is a 4×4 construction.

123. The tire bead assembly in accordance with claim 88 wherein said tire bead assembly is a 5×5 construction.

124. The tire bead assembly in accordance with claim 88 wherein said inside diameter surface is tapered.

125. A tire bead assembly comprising:
predetermined lengths of nominally circular cross-sectional multiple wires substantially free of an envelope of rubber-type materials extending along its length and wound about an axis to provide a plurality of convolutions of said multiples to provide a bead hoop having a bead wire array therein, with each convolution of said multiple wires in substantially wire-to-wire contact with at least one adjacent convolution of said multiple wires and positioned substantially in a plane parallel to the other convolutions of said multiple wires to provide a tire bead assembly having a an inside diameter surface, an outside peripheral surface and sidewall surfaces, with at least one of said ends of said predetermined lengths of multiple wires positioned internally with respect to said bead wire array, and
shape-retaining means engageable with at least a portion of said plurality of convolutions of said multiple wires of said tire bead assembly, said shape-retaining means engaging a substantial portion of the perimeter of the bead hoop cross-section and engaging at least a portion of the circumference of the bead hoop to retain the bead assembly in a planar configuration perpendicular to the axis of revolution of said bead hoop, to retain adjacent convolutions in said substantially wire-to-wire contact and to provide for void volumes within said bead wire array to permit entrapped air to be dissipated and minimized during a tire building operation.

126. The tire bead assembly in accordance with claim 125 wherein said shape-retaining means is a mechanical member.

127. The tire bead assembly in accordance with claim 126 wherein said mechanical member is a clip member periodically spaced about the circumference of the bead hoop.

128. The tire bead assembly in accordance with claim 127, wherein said clip member is preformed to conform to the profile of said bead wire array and periodically spaced about the circumference of the bead hoop.

129. The tire bead assembly in accordance with claim 127, wherein said mechanical member is a wire tie member periodically spaced about the circumference of the bead hoop.

130. The tire bead assembly in accordance with claim 127 wherein said mechanical member is a spiral-shaped spring clip member.

131. The tire bead assembly in accordance with claim 127 wherein said mechanical member is a fabric tape material equally spaced and wrapped about the circumference of the bead hoop.

132. The tire bead assembly in accordance with claim 127 wherein said mechanical member is a moldable polymeric material incapsulating at least a portion of said plurality of convolutions of said multiple wires of said tire bead assembly.

133. The tire bead assembly in accordance with claim 126, wherein said shape-retaining means is a predetermined length of an elongated material continuously wrapped about the circumference of the bead hoop to retain the tire bead assembly in a planer configuration.

134. The tire bead assembly in accordance with clam 133 wherein said predetermined length of said elongated material includes one end thereof anchored between the wire convolutions within the bead hoop.

135. The tire bead assembly in accordance with claim 126, wherein said shape-retaining means is effected by chemical bonding.

136. The tire bead assembly in accordance with claim 135, wherein said chemical bonding is by welding convolutions of said multiple wires to adjacent convolutions of said multiple wires.

137. The tire bead assembly in accordance with claim 135, wherein said chemical bonding is an adhesive material deposited on at least a portion of said plurality of convolutions of said multiple wires to bond convolutions of said multiple wires to adjacent convolutions of said multiple wires.

138. The tire bead assembly in accordance with claim 137 wherein said predetermined lengths of a multiple wire contain a fusable material and said chemical bonding is by activating said fusable material to bond convolutions of said multiple wire to adjacent convolutions of said multiple wires.

139. The tire bead assembly in accordance with claim 137 wherein said chemical bonding is by brazing convolutions of said multiple wires to adjacent convolutions of said multiple wires.

140. The tire bead assembly in accordance with claim 137, wherein said chemical bonding is by soldering convolutions of said multiple wires to adjacent convolutions of said multiple wires.

141. The tire bead assembly in accordance with claim 125 wherein at least one end of said predetermined lengths of said multiple wires is positioned substantially linear and parallel to adjacent convolutions.

142. A tire bead assembly comprising:
predetermined lengths of nominally circular cross-sectional multiple wires substantially free of an envelope of rubber-type materials extending along its length and wound about an axis to provide a bead hoop having a bead wire array therein, with each convolution of said multiple wires in substantially wire-to-wire contact with at least one adjacent convolution of said multiple wires and positioned substantially in a plane parallel to the other convolutions of said multiple wires to provide a tire bead assembly having an inside diameter surface, an outside peripheral surface and sidewall surfaces, with at least one of said ends of said predetermined lengths of multiple wires positioned externally on one of the side wall surfaces with respect to said bead wire array, and
shape-retaining means engageable with at least a portion of said plurality of convolutions of said multiple wires of said tire bead assembly, said shape-retaining means engaging a substantial portion of the perimeter of the bead hoop cross-section and engaging at least a portion of the circumference of the bead hoop to retain the bead assembly in a planar configuration perpendicular to the axis of revolution of said bead hoop, to retain adjacent convolutions in said substantially wire-to-wire contact, and to provide for void volumes within said bead wire array to permit entrapped air to be dissipated and minimized during a tire building operation.

143. The tire bead assembly in accordance with claim 142 wherein said shape-retaining means is a mechanical member.

144. The tire bead assembly in accordance with claim 143, wherein said mechanical member is a clip member periodically spaced about the circumference of the bead hoop.

145. The tire bead assembly in accordance with claim 144, wherein said clip member is preformed to conform to the profile of said bead wire array and periodically spaced about the circumference of the bead hoop.

146. The tire bead assembly in accordance with claim 143 wherein said mechanical member is a wire tie member periodically spaced about the circumference of the bead hoop.

147. The tire bead assembly in accordance with claim 139 wherein said mechanical member is a spiral-shaped spring clip member.

148. The tire bead assembly in accordance with claim 143 wherein said mechanical member is a fabric tape material periodically wrapped about the circumference of the bead hoop.

149. The tire bead assembly in accordance with claim 148 wherein said mechanical member is a moldable polymeric material incapsulating at least a portion of said plurality of convolutions of said single wire of said tire bead assembly.

150. The tire bead assembly in accordance with claim 143, wherein said shape-retaining means is a predetermined length of an elongated material continuously wrapped about the circumference of the bead hoop to retain the tire bead assembly in a planar configuration.

151. The tire bead assembly in accordance with claim 142, wherein said predetermined length of said elongated material includes one end thereof anchored between the wire convolutions within the bead hoop.

152. The tire bead assembly in accordance with claim 143 wherein said shape-retaining means is effected by chemical bonding.

153. The tire bead assembly in accordance with claim 152 wherein said chemical bonding is by welding convolutions of said multiple wires to adjacent convolutions of said multiple wires.

154. The tire bead assembly in accordance with claim 152, wherein said chemical bonding is an adhesive material deposited on at least a portion of said plurality of convolutions of said multiple wires to bond adjacent convolutions of said multiple wires.

155. The tire bead assembly in accordance with claim 152 wherein said predetermined lengths of multiple wires contain a fusable material and said chemical bonding is by activating said fusable material to bond adjacent convolutions of said multiple wires.

156. The tire bead assembly in accordance with claim 152 wherein said chemical bonding is by brazing adjacent convolutions of said multiple wires.

157. The tire bead assembly in accordance with claim 152 wherein said chemical bonding is by soldering adjacent convolutions of said multiple wires.

158. The tire bead assembly in accordance with claim 142 wherein at least one end of said predetermined lengths of said multiple wires is positioned substantially linear and parallel to adjacent convolutions.

* * * * *